US012701015B2

(12) United States Patent
De Caro et al.

(10) Patent No.: US 12,701,015 B2
(45) Date of Patent: Aug. 4, 2026

(54) HTLC WITH PROOF OF ELAPSED TIME

(71) Applicant: International Business Machines Corporation, Armonk, NY (US)

(72) Inventors: Angelo De Caro, Zürich (CH); Yacov Manevich, Haifa (IL); Luca De Feo, Rüschlikon (CH)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 17/564,303

(22) Filed: Dec. 29, 2021

(65) Prior Publication Data

US 2023/0208648 A1    Jun. 29, 2023

(51) Int. Cl.
| | |
|---|---|
| *H04L 29/06* | (2006.01) |
| *G06Q 20/40* | (2012.01) |
| *H04L 9/08* | (2006.01) |
| *H04L 9/32* | (2006.01) |
| *H04L 9/00* | (2022.01) |

(52) U.S. Cl.
CPC ......... *H04L 9/3247* (2013.01); *G06Q 20/407* (2013.01); *H04L 9/0869* (2013.01); *H04L 9/3297* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 11,188,977 | B2 * | 11/2021 | Youb | ................. G06Q 30/0645 |
| 2017/0187535 | A1 * | 6/2017 | Middleton | ............ H04L 9/3247 |

| | | | | |
|---|---|---|---|---|
| 2018/0183611 | A1 * | 6/2018 | Bohli | ..................... H04L 63/08 |
| 2020/0136815 | A1 * | 4/2020 | Trevethan | ............. H04L 9/3297 |
| 2020/0137082 | A1 * | 4/2020 | Jimenez-Delgado | ......................... H04L 9/0643 |
| 2020/0219097 | A1 * | 7/2020 | Chan | .................... G06Q 20/401 |
| 2021/0311934 | A1 * | 10/2021 | Fang | .................... H04L 9/3247 |

(Continued)

FOREIGN PATENT DOCUMENTS

| | | |
|---|---|---|
| CN | 109409877 B | 12/2020 |
| CN | 113283985 A | 8/2021 |

(Continued)

OTHER PUBLICATIONS

International Search Report and Written Opinion issued in the International Application No. PCT/EP2022/087521, mailed on Mar. 13, 2023.

(Continued)

*Primary Examiner* — Eleni A Shiferaw
*Assistant Examiner* — Hassan A Hussein
(74) *Attorney, Agent, or Firm* — CHIP LAW GROUP

(57) ABSTRACT

An example operation may include one or more of generating a hashed timelock contract (HTLC) of an asset and storing the HTLC in a storage structure, where the HTLC requires proof of a condition by a receiver within a predetermined amount of time for the receiver to unlock the asset, executing, via a processing device, a sequential computation a predetermined number of steps and generating proof of a computational load based on an output of the serial computation, determining that the condition for the client to unlock the HTLC has expired, and transmitting a request for a refund of the asset which comprises the proof of the computational load as proof of elapsed time to the storage structure.

17 Claims, 22 Drawing Sheets

(56)           References Cited

U.S. PATENT DOCUMENTS

| | | | |
|---|---|---|---|
| 2021/0326869 A1* | 10/2021 | Fang | G06F 21/64 |
| 2021/0398116 A1* | 12/2021 | Fang | G06Q 20/38215 |
| 2022/0156725 A1* | 5/2022 | Iwama | G06Q 20/3676 |
| 2022/0284011 A1* | 9/2022 | Qian | G06F 16/2343 |
| 2022/0405752 A1* | 12/2022 | Davies | G06Q 20/3825 |
| 2023/0004967 A1* | 1/2023 | Davies | G06Q 20/401 |
| 2026/0064540 A1* | 3/2026 | Teli | G06F 11/1464 |

FOREIGN PATENT DOCUMENTS

| | | | |
|---|---|---|---|
| WO | 2021023094 A1 | 2/2021 | |
| WO | 2023/126313 A1 | 7/2023 | |

OTHER PUBLICATIONS

Mercan et al., Cryptocurrency Solutions to Enable Micro-Payments in Consumer IoT, IEEE Consumer Electronics Magazine, 2021, ISSN: 2162248, Feb. 4, 2021.

* cited by examiner

250

410

430

(Evaluation Phase)

Sequential
Computation

Threshold Load
(PoET)

442

Client
408

Computational
Load

(Verification Phase)

Sequential
Computation

Threshold Load
(Verification)

Blockchain Peer
452

Computational
Load

454

500

Generating and Storing an HTLC in a
Storage Structure — 510

Executing a Serial Computation a Predetermined
Number of Steps to Generate Proof of
Elapsed Time (PoET) — 520

Determining that the HTLC Has Expired — 530

Transmitting the PoET to the Storage Structure — 540

600

640

650

660

New Data Block 730

Block Header  740

| Number | Previous Hash | Data Hash |
|--------|---------------|-----------|

Block Data 750
    - N Transactions

| Type, Version, Channel ID, Tx ID, . . . | |
|---|---|
| Chaincode Data | Endorser Data |
| Read Set | Write Set |

752

| a) Parameters    c) Initial Seed |
|---|
| b) PoET    d) T |

Block Metadata 760

| Orderer Data | Signatures |
|--------------|------------|
| Last Config | Valid/Invalid Txs |

Host Platform
820

Blockchain 810

Asset(s)
830

804

Asset
830

Host Platform
820

Blockchain 810

850

900

HTLC WITH PROOF OF ELAPSED TIME

BACKGROUND

A centralized platform stores and maintains data in a single location. This location is often a central computer, for example, a cloud computing environment, a web server, a mainframe computer, or the like. Information stored on a centralized platform is typically accessible from multiple different points. Multiple users or client workstations can work simultaneously on the centralized platform, for example, based on a client/server configuration. A centralized platform is easy to manage, maintain, and control, especially for purposes of security because of its single location. Within a centralized platform, data redundancy is minimized as a single storing place of all data also implies that a given set of data only has one primary record.

SUMMARY

One example embodiment provides an apparatus that includes one or more of a memory that includes a storage structure, and a processor configured to one or more of generate a hashed timelock contract (HTLC) of an asset and store the HTLC in the storage structure, where the HTLC requires proof of a condition by a receiver of the asset within a predetermined amount of time for the receiver to unlock the asset, execute a sequential computation a predetermined number of steps and generate proof of a computational load based on an output of the sequential computation, determine that the condition to unlock the HTLC has expired, and transmit a request for a refund of the asset which comprises the proof of the computational load as proof of elapsed time to the storage structure.

Another example embodiment provides a method that includes one or more of generating a hashed timelock contract (HTLC) of an asset and storing the HTLC in a storage structure, where the HTLC requires proof of a condition by a receiver of the asset within a predetermined amount of time for the receiver to unlock the asset, executing, via a processing device, a sequential computation a predetermined number of steps and generating proof of a computational load based on an output of the sequential computation, determining that the condition for the client to unlock the HTLC has expired, and transmitting a request for a refund of the asset which comprises the proof of the computational load as proof of elapsed time to the storage structure.

A further example embodiment provides a non-transitory computer readable medium comprising instructions, that when read by a processor, cause the processor to perform one or more of generating a hashed timelock contract (HTLC) of an asset and storing the HTLC in a storage structure, where the HTLC requires proof of a condition by a receiver of the asset within a predetermined amount of time for the receiver to unlock the asset, executing, via a processing device, a sequential computation a predetermined number of steps and generating proof of a computational load based on an output of the sequential computation, determining that the condition for the client to unlock the HTLC has expired, and transmitting a request for a refund of the asset which comprises the proof of the computational load as proof of elapsed time to the storage structure.

BRIEF DESCRIPTION OF THE DRAWINGS

FIG. 7B is a diagram illustrating data contents of a new data block, according to example embodiments.

DETAILED DESCRIPTION

Figure 1A:
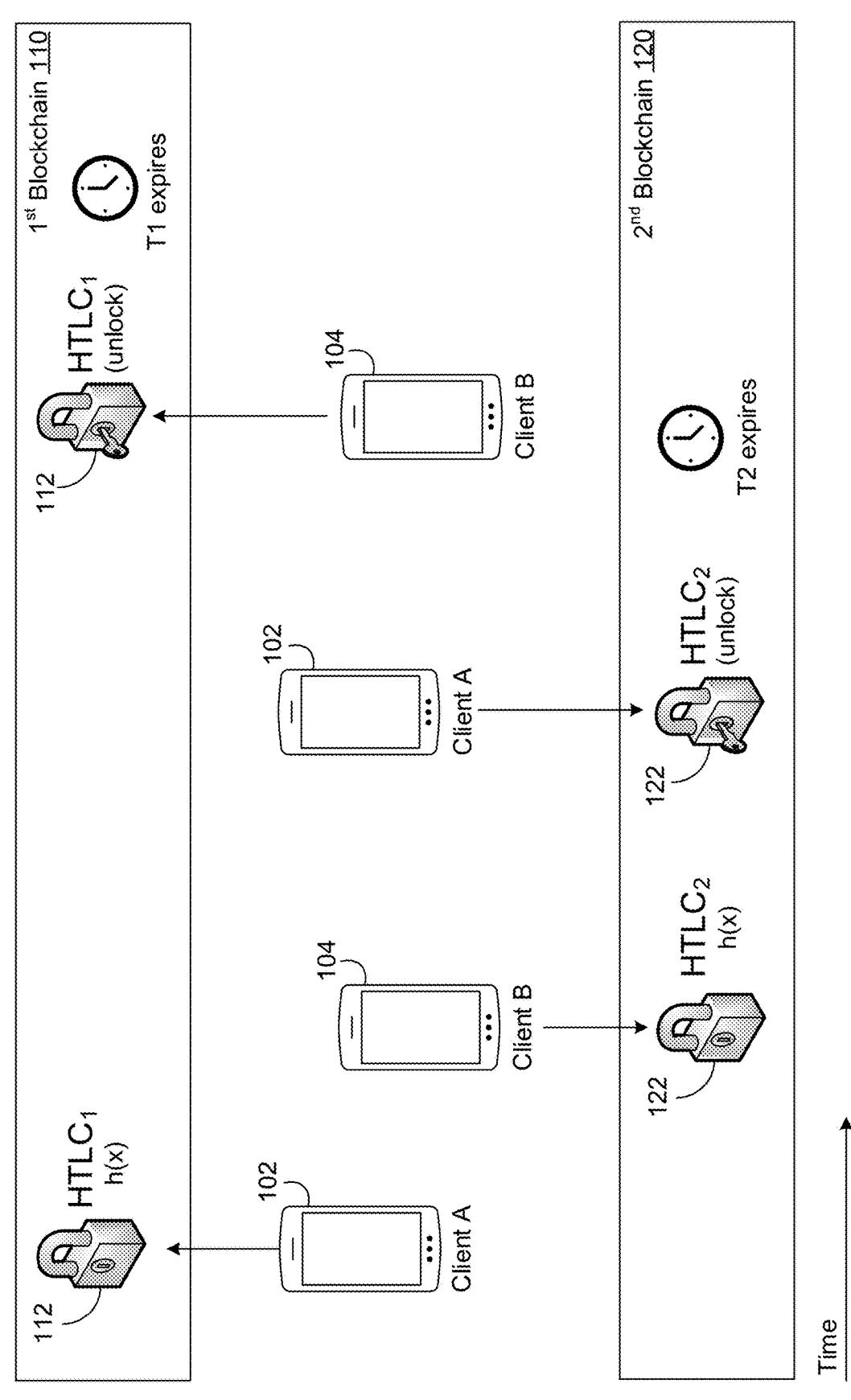
FIG. 1A is a diagram illustrating a process of executing a cross-chain transaction according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, which enable a sender of a hashed timelock contract (HTLC) to obtain a refund in a consistent amount of time using a proof of computational load instead of requiring more blocks to be stored on the blockchain. Thus, the timing condition for unlocking the HTLC can be more reliable especially in a case where the blocks are not created and stored on the blockchain ledger in a consistent manner like BITCOIN®. Another aspect of the example embodiments enable verification of the computational load with significantly less computational steps than performed by the sender thus reducing the load on blockchain peers that verify the refund.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Different entities (e.g., institutions, organizations, etc.) may require different blockchains to manage resources. Therefore, a transaction can often spread across multiple blockchains, referred to herein as a cross-chain transaction. In a cross-chain transaction, a first part of the transaction (e.g., a first transfer of assets, etc.) may be managed on a first blockchain, and a second part of the transaction (e.g., a second transfer of assets in exchange for the first transfer of assets, etc.) may be managed on a second blockchain. A simple example of a cross-chain transaction is swapping assets in a first cryptocurrency (managed by a first blockchain) for assets in a second cryptocurrency (managed by a second blockchain), where each cryptocurrency is managed on its own blockchain. However, many other types of cross-chain transactions are possible.

Cross-chain transactions are becoming more and more necessary, especially for applications such as cross-chain portable assets, cross-chain exchange, and so on. Hashed timelocks are a technique that can be used to guarantee the atomicity of such cross-chain transactions due to its ease of implementation and robust trust model. An HTLC is a type of transfer that uses hashlocks and timelocks to require the receiver of a payment/transfer of assets to satisfy a condition of the payment/transfer prior to the expiration of a timer by generating cryptographic proof of the condition. Otherwise, the ability to claim the transfer can be aborted by the sender/creator of the HTLC.

As described herein, a hashlock is a scrambled version of a secret (e.g., cryptographic key) generated by the originator of the transaction. In a HTLC, the originating party generates a secret and hashes it. The secret is stored as a pre-image that is subsequently revealed during the final transaction. The hashlock is unlocked as a result of the revealing of the pre-image and the funds are claimed to the target party of the HTLC. Another important element of the HTLC is a deadline. When claiming the funds of the HTLC the time needs to be earlier than the deadline, and when reclaiming the funds back to the HTLC creator, the time needs to be later than the deadline.

A typical HTLC can be unlocked in one of two ways. The first way is by the designated receiver of the asset submitting proof of a condition within a predetermined amount of time. The proof of condition may be a document, a financial transaction, a data value, or the like but it usually a randomly chosen string. When the proof of condition is received by a blockchain peer, the blockchain peer can unlock the HTLC, extract the asset, and transfer it to the receiver. The second way for the HTLC to be unlocked is when the time reaches the HTLC's deadline defined at its creation. In this case, the sender can reclaim the asset (i.e., obtain a refund) by submitting a transaction on the blockchain network.

However, one of the drawbacks of HTLCs is that they traditionally rely on new blocks being added to the blockchain as the timing mechanism. In other words, the receiver must unlock the HTLC (e.g., submit proof of a condition, etc.) prior to a predetermined number of new blocks being recorded on the blockchain ledger. For blockchain frameworks such as BITCOIN®, this process is reliable because, on average, a new block is added to the BITCOIN® blockchain about every 10 minutes. Thus, for a blockchain framework like BITCOIN®, the new blocks added to the blockchain is consistent over time and can be used as a consistent timer. However, for other blockchain frameworks such as HYPERLEDGER FABRIC® and others, the rate at which new blocks are added to the blockchain may vary drastically. As a result, new blocks being added to the blockchain is not reliable timing mechanism for some blockchain networks.

For example, if a transaction load of the blockchain network is scarce or not as present as in other blockchain networks, the blockchain network may add new blocks to the blockchain ledger too infrequently. On the other hand, under high transactional load, the blockchain network may add new blocks too frequently. In either case, the stability/reliability of new blocks being used as a timing mechanism is not reliable. Moreover, the block's creation time may not be encoded in the block. As a result, the security of the protocol may be impaired.

Blockchain is unique in that timestamps are not an accurate timing mechanism because of the clock differences that almost always exist among the different blockchain peers (which may be in the hundreds or even thousands). In addition, the lack of a central entity, and the likely inclusion of untrusting participants on the blockchain make it difficult for the peers to trust one another. Therefore, the timing issues cannot simply be resolved with timestamps.

To address the problems of timing on blockchain networks where blocks are not added to the blockchain at a consistent rate, the example embodiments use a new mechanism for proof of elapsed time (PoET). In particular, the present application relies on generating a computational load along with proof of the computational load by the sender before they can reclaim the asset and unlock the HTLC. For example, a serial computation may be iteratively performed a predetermined number (N) of steps in sequence (e.g., 100 steps, 256 steps, 500 steps, etc.) The serial computation may be performed based on an initial random seed value that is generated taking into consideration public parameters pulled from the blockchain ledger. Here, the receiver may perform an initial serial computation by inputting the random seed value into a serial algorithm. The output of the serial algorithm may be the input for the next step in the serial algorithm. This process may be repeated over and over until a threshold number of steps are performed. The result is a value/string that is output by the serial computation after the predetermined number of serial computations are performed.

By using the public parameters stored on the blockchain, the other participants of the blockchain can verify the serial computation. For example, each peer may perform the same serial computation, the same number of predetermined threshold steps starting on the initial random seed value, and arrive at the same result as the sender attempting to unlock the HTLC. However, to improve the verification process, the verifier may only perform the serial computation a fraction of the steps that the sender performs the serial computation. For example, the sender may perform the serial computation T steps (i.e., a sequence of T number of steps) to arrive at the final value. Meanwhile, the sender may also add an intermediate value that is created by performing the serial computation on the initial seed value less number of steps, for example, only log(T) steps. Here, the verifier may perform a different calculation that requires a fraction of the number of steps compared to the sender, because the verifier may use the output of the sender's computation to make its own computation shorter. Thus, the verifier can perform the verification in only a fraction of the time that it takes the sender.

The serial computation may be an algorithm that when processed in parallel on a multi-core processor it is as fast as being processed in serial. This prevents a/peer from cheating the PoET process and performing the computation spread out over many processor cores thereby significantly reducing the amount of time it takes to perform the computation. By implementing a serial computation, the example embodiments can prevent a sender from running the computations on multi-cores and cheating the process.

FIG. 1A illustrates a process 100A of executing a cross-chain transaction according to example embodiments. Referring to FIG. 1A, a client 102 and a client 104 reach an agreement to exchange an asset owned by client 102 for funds owned by client 104. Here, the property owned by client 102 may be managed on a first blockchain 110 and the funds owned by client 104 may be managed on a second blockchain 120 which is independent from the first blockchain 120. For example, the first and second blockchains 110 and 120 may be managed by different sets of blockchain peers with different registration requirements, and the like. As another example, the first and second blockchains 110 and 120 may be managed by the same blockchain peers but on different channels. The first and second blockchains 110 and 120 may have different blockchain ledgers, different access/permissions, different orderer nodes, different smart contracts, and the like.

In this example, both the client 102 and the client 104 may have client software of both the first and second blockchains 110 and 120 installed therein. That is, the client 102 and the client 104 may register with both the first blockchain and the second blockchains 110 and 120, and submit blockchain transactions for processing on each of the first and second blockchains 110 and 120. Furthermore, both the client 102 and the client 104 may have respective blockchain wallets for transacting on the first and second blockchains 110 and 120. Here, the blockchain wallets may be assigned memory addresses by the first and second blockchain 110 and 120 thereby enabling HTLCs to identify the clients based on their wallet addresses.

According to various embodiments, the client 102 may generate a HTLC 112 on the first blockchain 110 transferring the asset to the client 104, and hashlock the HTLC 112 using a hashed secret x (secret=preimage of the hashlock). The client 102 may also put the address of the client 104 thus enabling the client 104 to unlock the HTLC 112 using a private key corresponding to the address. The client 102 may transmit/communicate the hashed secret to the client 104 via a communication channel/network.

In response, the client 104 may generate a HTLC 122 and store it on the second blockchain 120 which transfers funds to the client 102 as a corresponding value in response to the transfer of property by the client 102 to the client 104.

Furthermore, the client 104 may hashlock the HTLC 122 using the hashed secret provided from the client 102. In order to open the hashlock and receive the funds, the client 102 may reveal the secret on the second blockchain 120 by storing it on the chain. By revealing the secret, the hashlock based on the hashed secret is opened. Thus, the client 102 may receive the funds from the client 104. Furthermore, the client 104 may detect the secret being revealed on the second blockchain 120. Now, the client 104 can unlock the HTLC 112 on the first blockchain 110 thus receiving the property from client 102.

Figure 1B:
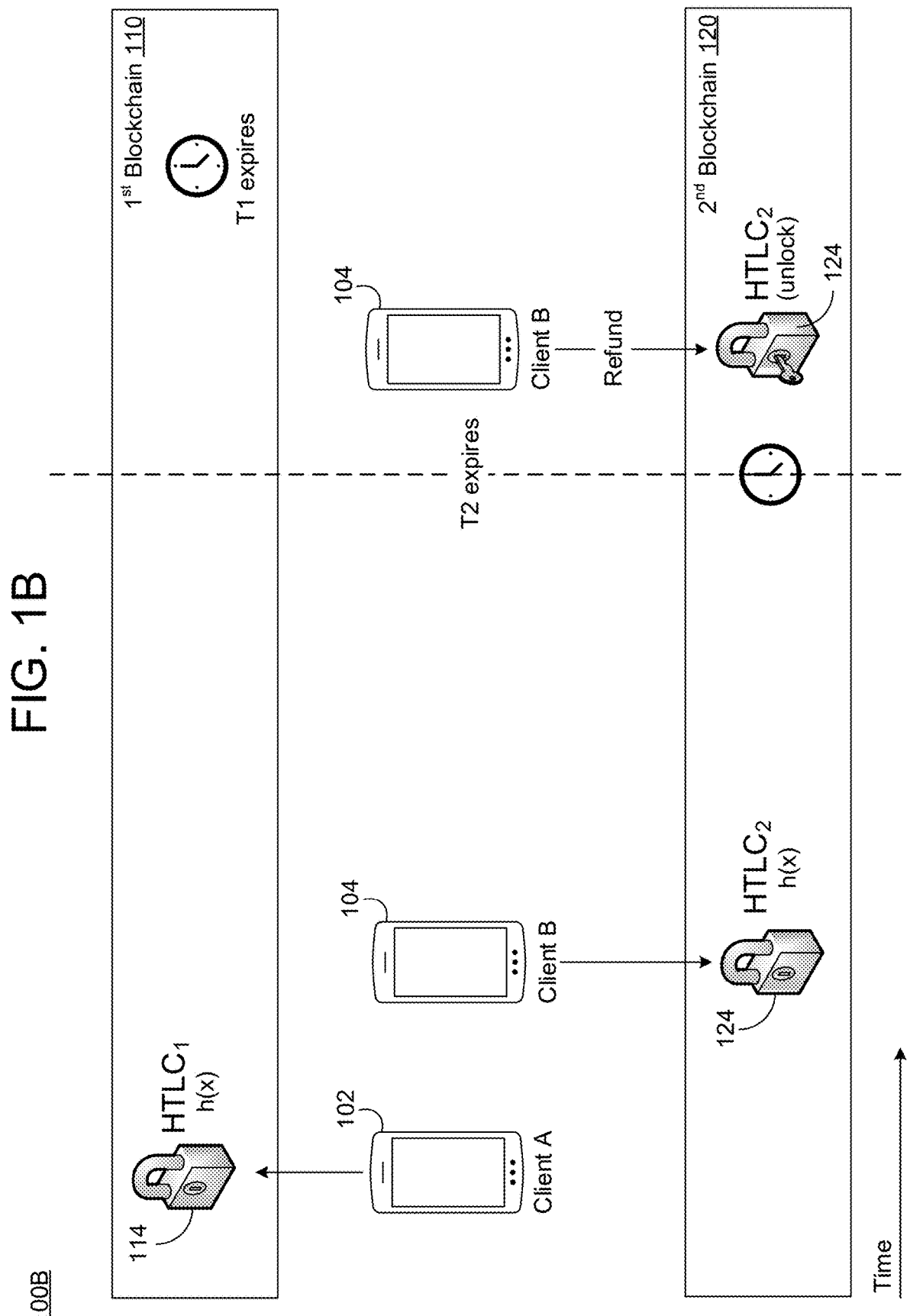
FIG. 1B is a diagram illustrating a process of aborting a cross-chain transaction and requesting a refund of the asset according to example embodiments.

FIG. 1B illustrates a process 100B of aborting a cross-chain transaction and requesting a refund of the asset according to example embodiments. Referring to FIG. 1B, just as in the example of FIG. 1A, the client 102 has stored a HTLC 114 on the blockchain 110 for a transfer of an asset (e.g., a digital asset, a real asset, etc.) to the client 104 and the client 104 has stored an HTLC 124 on the second blockchain providing payment to the client 102 for the asset that is included in the HTLC 114. Here, the second HTLC 124 may have an expiration that is before the expiration of the HTLC 114. This provides the client 104 with an opportunity to collect a refund from the funds stored in the HTLC 124.

In the example of FIG. 1B, unlike the example in FIG. 1A, the client 102 does not unlock the HTLC 124 in time before a timer expires. For example, the client 102 may not satisfy a condition in the HTLC 124 for transferring the asset to the client 104. For example, the condition may be uploading a particular document (e.g., proof of title, etc.), transacting a sale of another property, having sufficient funds in a specified bank account, etc. The time threshold may be specified in the HTLC 124. Here, the time threshold may be a new block that identifies how many (i.e., a number) of new blocks that must be stored on the blockchain 120 before the timer of the HTLC 124 expires. When the new block threshold is reached, the HTLC 124 expires for the client 102 and can only be claimed by the client 104. Here, the client 104 may submit a request for a refund along with the same pre-image to unlock the HTLC 124 and refund the asset back to a blockchain wallet of the client 104 (on the blockchain 120).

The refund process shown and described in FIG. 1B may work somewhat well for blockchain networks where blocks are cut at a consistent rate of speed/frequency. For example, in the BITCOIN® blockchain network, a block may be cut about every 10 minutes allowing blocks added to the blockchain to be used as an approximate timing mechanism. However, for blockchain networks where blocks are not added to the blockchain at a continuous and consistent rate, the use of blocks added to the blockchain as a timing mechanism is highly unreliable because the same amount of blocks being stored on the ledger may take a significantly longer amount of time when blockchain transactions are not being submitted very often, while the timing mechanism may take a much shorter amount of time when the blockchain network is facing increased transactional traffic.

The example embodiments are directed to a HTLC technology which replaces a traditional timing mechanism (new blocks added to the ledger) for a refund of an HTLC with a new timing mechanism that is includes a proof of elapsed time (PoET) derived from performance of a predetermined amount of computational load (serial computations). That is, the PoET in the example embodiments is based on a computational load expended by the party requesting the refund of the transaction swap instead of the traditional timing mechanism of blocks being added to the blockchain ledger. In doing so, the example embodiments overcome the deficiencies in reliability of the traditional timing mechanism that relies on new blocks being added to the blockchain, and can be performed and verified regardless of how many blocks are added to the blockchain. Below is an example of an equation that represents the steps performed by the refund requester (sender) and the blockchain network that is verifying the request.

Setup($1''$)→pp

Eval(pp, s, T)→$\pi$

Verify(pp, s, T, $\pi$)→Accept/Reject

In this example, 'pp' corresponds to public parameters, 's' corresponds to a string value or the random seed value, 'T' corresponds to a number of execution cycles, and '$\pi$' corresponds to a proof of elapsed time or PoET. The PoET created by the sender is embodied in the "Eval" stage, while the verification of the proof is performed in the "Verify" stage. Meanwhile, in the "Setup" phase, a party (or a number of parties) run a protocol and output public parameters that are then put on a public bulletin board of the blockchain or some other location and all parties in the network then learn about these public parameters. The input to the "Setup" phase is some security parameter that determines the number of bits in the numbers that are used in the protocol.

The parameters may be published globally, for example, by posting them into a blockchain or encoding them into the application logic of a blockchain smart contract. The parameters may be published by the parties that are participating in the blockchain network, or a trusted representative of these parties. As an example, the global parameters may be numbers or equations that define how to evaluate the "Eval" phase. One embodiment of the global parameters can be a composite number N that is a product of two primes. N is usually very big, thousands of bits long.

No one should know which primes were used to compute N, and thus it needs to be computed in a safe manner via either a trusted party or a privacy preserving protocol that searches for primes and outputs their product without any of the parties knowing which primes were used. Then, knowing this N and some starting point x<N, the "Eval" phase operation amounts to successive iterations of squaring followed by modulo reduction by N (in the first step, x0=x, then x1=x^2% N, then x2=x—4% N and so on and so forth). The last element would be x^(2^T) % N (x raised to the power of two raised to the power of T, modulo N). The proof that is output from the "Eval" phase is computed from the last successive squaring modulo N (x^(2^T)) by the client, via an algorithm (there are multiple ways known to do so).

During the "Eval" phase, the sender may run a sequential computation for a certain amount of steps starting from some seed value. The seed value may be generated based on the public parameters generated during the "Setup" phase. Each iteration modifies the output of the previous computation until a predetermined number of serial computations have been performed (e.g., a threshold number of computations, a threshold processing load is reached, etc.). Then, the sender outputs a proof (which may be the output of the serial computation in the last step) which can be used in the "Verify" phase.

During the "Verify" phase, a blockchain peer or other verification entity may check the proof output from the "Eval" phase with respect to a given seed, the claimed given number of steps that Eval has used, and either accepts or rejects the proof. In some embodiments, the sender may provide a proof of the elapsed time that is generated by performing the serial computation a predetermined number of steps (e.g., a sequence of 100 steps performed one after the other, etc. on some input value). In this example, the sender may execute the same serial algorithm 100 number of steps.

However, in some embodiments, the sender may generate a verification proof after a fraction of the steps of executing the same serial algorithm. For example, the sender may also capture an output of the serial computation after the tenth execution of the serial algorithm and store that with the full proof of elapsed time created from the output of the $100^{th}$ execution of the serial computation. Here, a smaller number of serial computations (e.g., 10 computations, etc.) can be used by the verifier during the "Verify" phase. That is, the verifier can execute the serial computation ten steps starting on the same initial seed value and generate a proof after the tenth step (e.g., the output of the tenth step) and compare it to the verification proof provided by the sender. The smart contract that implements the regular standard known cross chain swap is different than a smart contract used by the blockchain of the example embodiments during the "Verify" phase because the smart contract verifies the proof of elapsed time performed by the sender requesting the refund.

There is a chance that a sender may start performing the serial computation before the HTLC gets put onto the ledger. In other words, the sender may try to cheat and partially perform a large portion of the serial computation prior to placing the HTLC (and unlockable with the serial computation) on the blockchain. To prevent such a sender from cheating, the example embodiments can require that the sender start the computation based on blockchain ledger data that is found in a block after the HTLC is stored on the blockchain. This ensures that the HTLC must be stored before the sender can start executing the serial computation. Further examples of generating the PoET and verifying the PoET are described herein with respect to FIGS. 4A-4D.

Figure 2A:
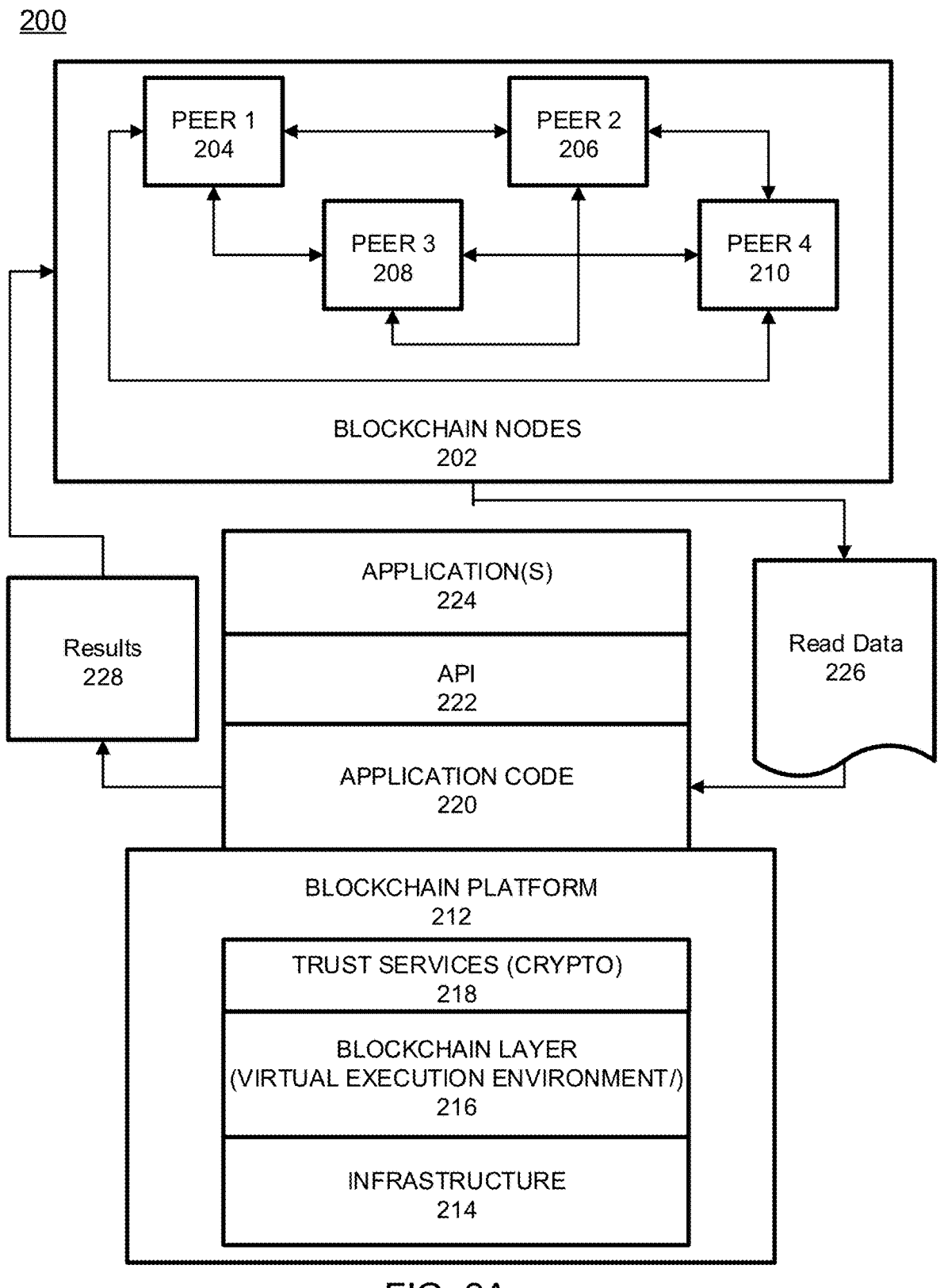
FIG. 2A is a diagram illustrating an example blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the smart contract (or chaincode executing the logic of the smart contract) may read blockchain data 226 which may be processed by one or more processing entities (e.g., virtual machines) included in the blockchain layer 216 to generate results 228 including alerts, determining liability, and the like, within a complex service scenario. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into one or more blocks within the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract. For example, the chaincode may include a packaged and deployable version of the logic within the smart contract. As described herein, the chaincode may be program code deployed on a computing network, where it is executed and validated by chain validators together during a consensus process. The chaincode may receive a hash and retrieve from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
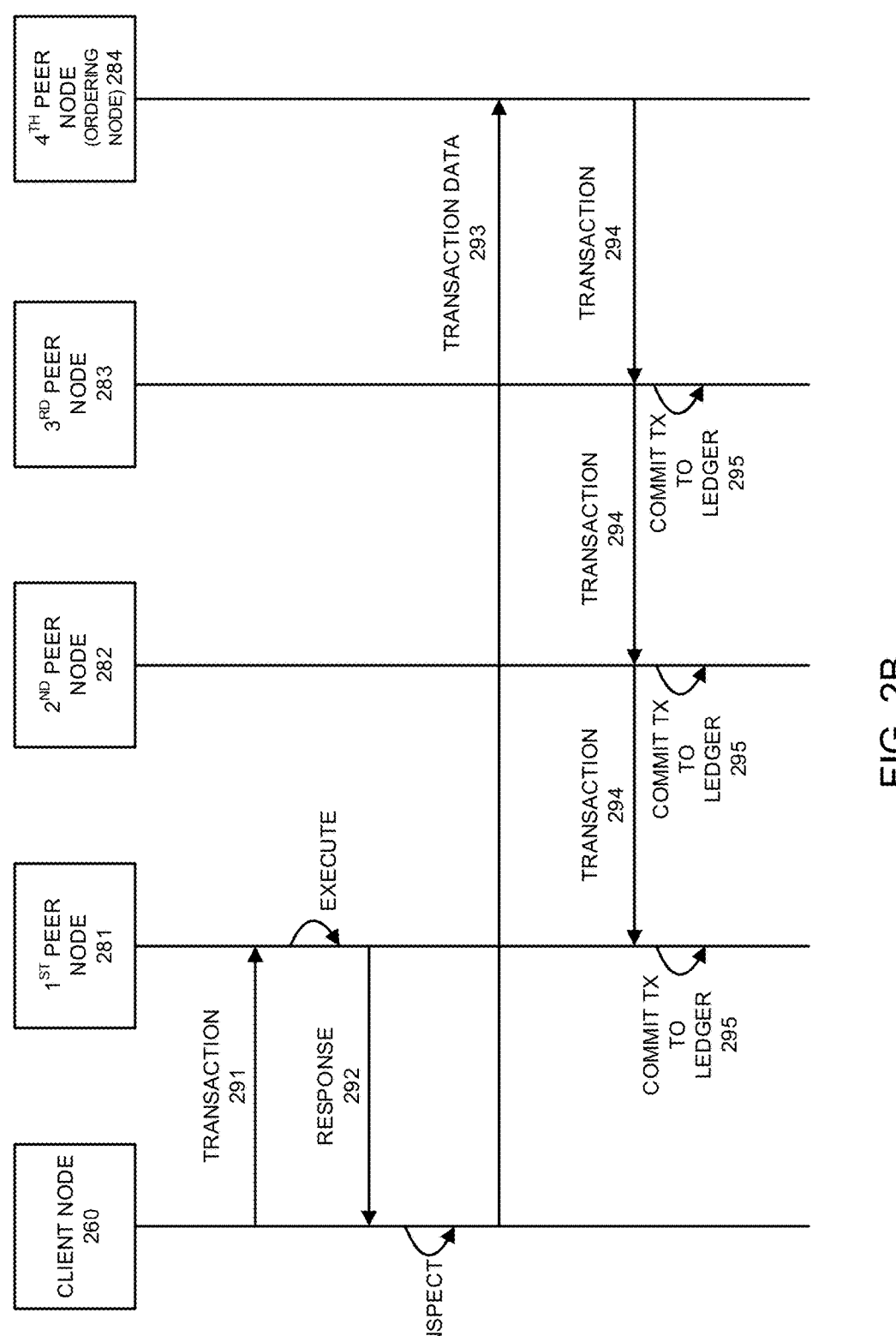
FIG. 2B is a diagram illustrating a blockchain transactional flow among nodes, according to example embodiments.

FIG. 2B illustrates an example of a blockchain transactional flow 250 between nodes of the blockchain in accordance with an example embodiment. Referring to FIG. 2B, the transaction flow may include a client node 260 transmitting a transaction proposal 291 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). Here, the endorsing peer 281 may determine whether or not to endorse the transaction proposal. The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction proposal and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks are delivered from the ordering node 284 to all peer nodes 281-283 on the channel. The data section within the block may be validated to ensure an endorsement policy is fulfilled and to ensure that there have been no changes to ledger state for read set variables since the read set was generated by the transaction execution. Furthermore, in step 295 each peer node 281-283 appends the block to the channel's chain, and for each valid transaction the write sets are committed to current state database. An event may be emitted, to notify the client application that the transaction (invocation) has been immutably appended to the chain, as well as to notify whether the transaction was validated or invalidated.

Figure 3A:
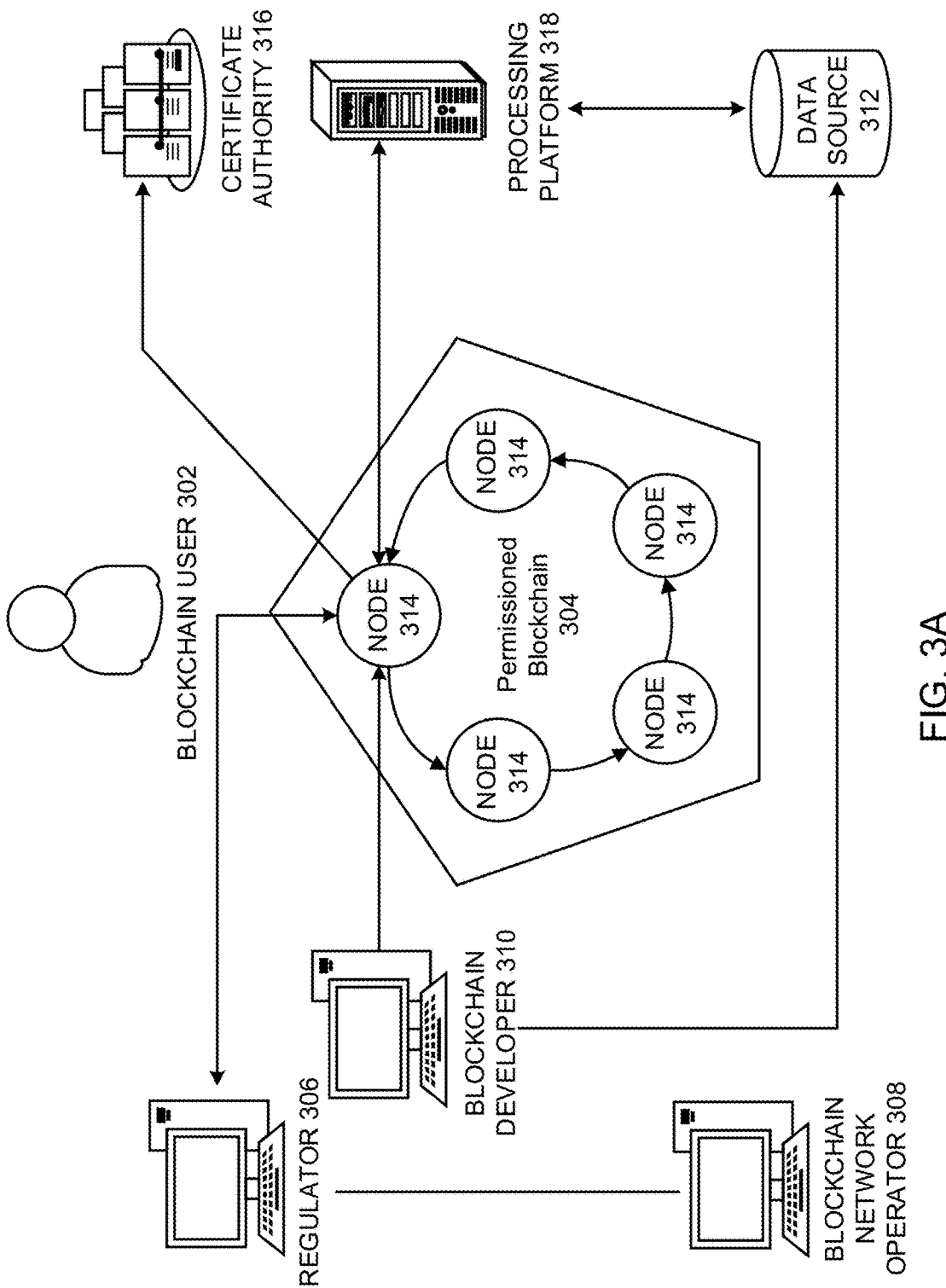
FIG. 3A is a diagram illustrating a permissioned network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
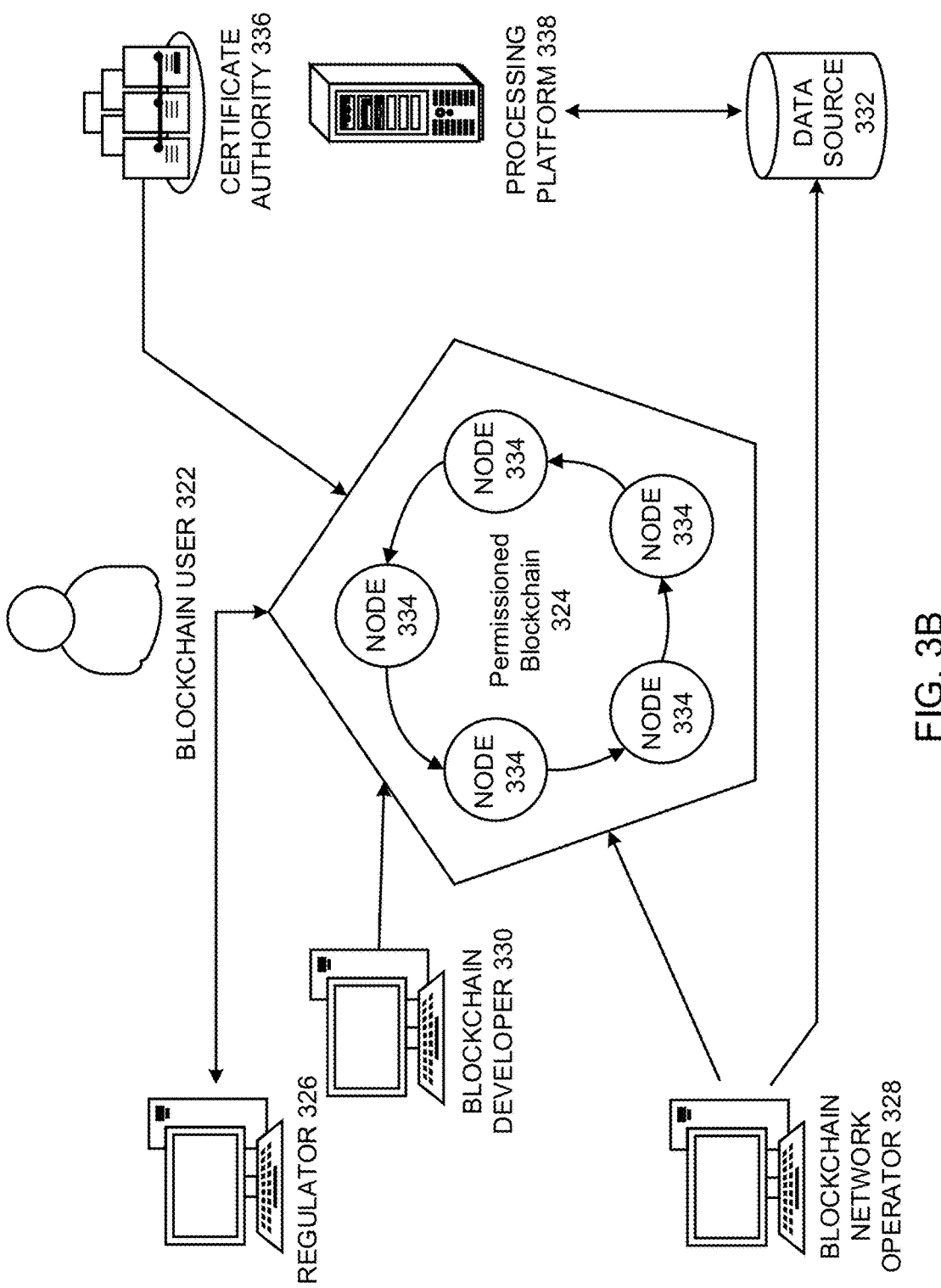
FIG. 3B is a diagram illustrating another permissioned network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
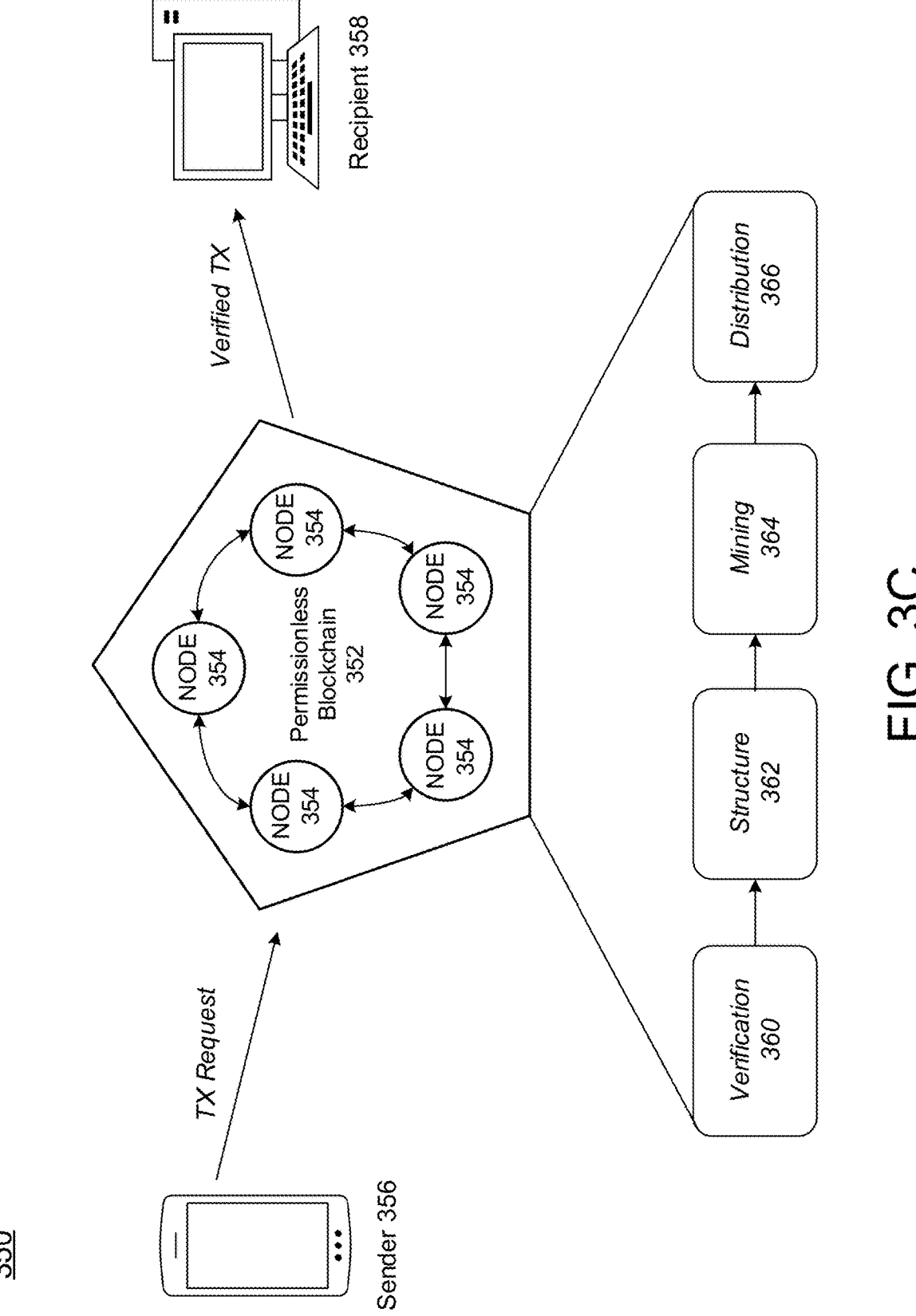
FIG. 3C is a diagram illustrating a permissionless network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block is increased, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 4A:
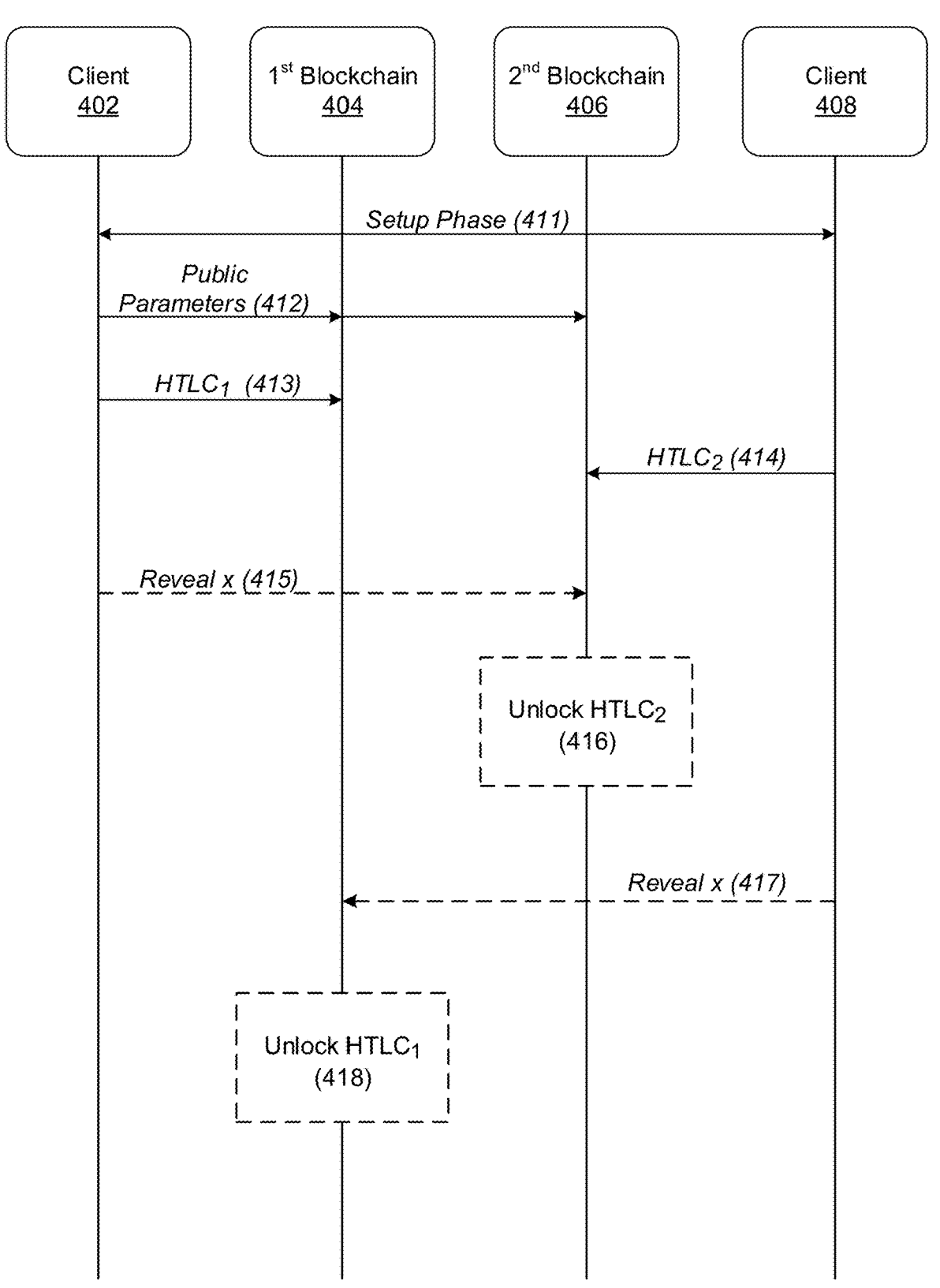
FIG. 4A is a diagram illustrating a communication sequence of a cross-network transaction according to example embodiments.

FIG. 4A illustrates a communication sequence 410 among participants of a cross-network transaction according to example embodiments. For example, the communication sequence 410 may be performed between two clients that are both registered participants on two different blockchain networks. In the example of FIG. 4A, the communications are carried out between a client 402 and a client 408 via a first blockchain 404 and a second blockchain 406. In this example, the first blockchain 404 may be stored on a blockchain ledger distributed among a first set of peer computers that form a first blockchain network. Likewise, the second blockchain 406 may be stored on a blockchain ledger that is distributed among a second set of peer computers the perform a second blockchain network. In some cases, the peers may be the same in both blockchains 404 and 406, or they may be partially overlapping or completely different.

Referring to FIG. 4A, in 411, the client 402 agrees to transfer an asset to the client 408, possibly off-chain, and the client 408 agrees to transfer another asset to the client 402, in return. As an example, the client 402 may agree to send a digital token (e.g., cryptocurrency, etc.) managed on first blockchain 404 to the client 408. In response, the client 408 may agree to transfer a different cryptocurrency of some kind managed on the second blockchain 406 to the client 402. A cross-chain transaction swap using HTLCs may be used to carry out this transaction. Here, the client 402 may contract to provide a valid digital token within two days of the HTLC being stored on the blockchain. If the two days expires, the client 408 may have the right to a refund.

In 411, the client 402 and the client 408 execute a setup protocol to establish parameters that are then used to seed a serial computation. Next, in 412 the client 402 adds the public parameters to the first blockchain 404 and the second blockchain 406 by submitting blockchain transactions to each of the first blockchain 404 and the second blockchain 406 which includes the public parameters. In 413, the client 402 generates and stores a HTLC on the blockchain 404 which transfers an asset managed by the blockchain 404 to the client 408. Likewise, in 414, the client 408 generates and stores a HTLC on the blockchain 406 which transfers an asset managed by blockchain 406 to the client 402. Here, the client 408 may put their HTLC on the blockchain 406 only after the client 402 has added their HTLC to the blockchain 404 to ensure its safe to make the transfer.

The HTLCs may include clauses for refunds. For example, in 414, the client 408 may add a clause, statement, instruction, etc. to the HTLC that indicates that the client 402 must unlock the HTLC within a predetermined amount of time (e.g., two days). Here, two days may be equal to about 150,000,000,000 executions (i.e., number of steps executed in sequence) of a serial computation. Therefore, the client 408 may include an identifier of the proof of computational load to satisfy the refund, for example, the result of 150,000,000,000 executions of the serial computation that are necessary and the seed value for the serial algorithm, etc. In this case, the serial algorithm may be known to all participants of the blockchains.

In 415, the client 402 submits the memory address of the digital token stored on the blockchain 404 to the blockchain 406 to satisfy the condition in the HTLC stored by the client 408. In 416, the blockchain 406 may unlock the HTLC stored thereon by the client 408, and transfer the asset to the client 402 (e.g., to a blockchain wallet address of the client 402) via the blockchain 404). When the client 408 completes executing the serial execution the predetermined number of steps, the client 408 may check whether the HTLC stored on the blockchain 406 has been unlocked or not. If it has been unlocked, in 417, the client 408 may submit a request to unlock the HTLC stored by the client 402 on the blockchain 404. In 418, the blockchain 404 may unlock the asset and transfer it to the client 408 via the blockchain 404. Thus, the cross-chain swap can be accomplished.

Figure 4B:
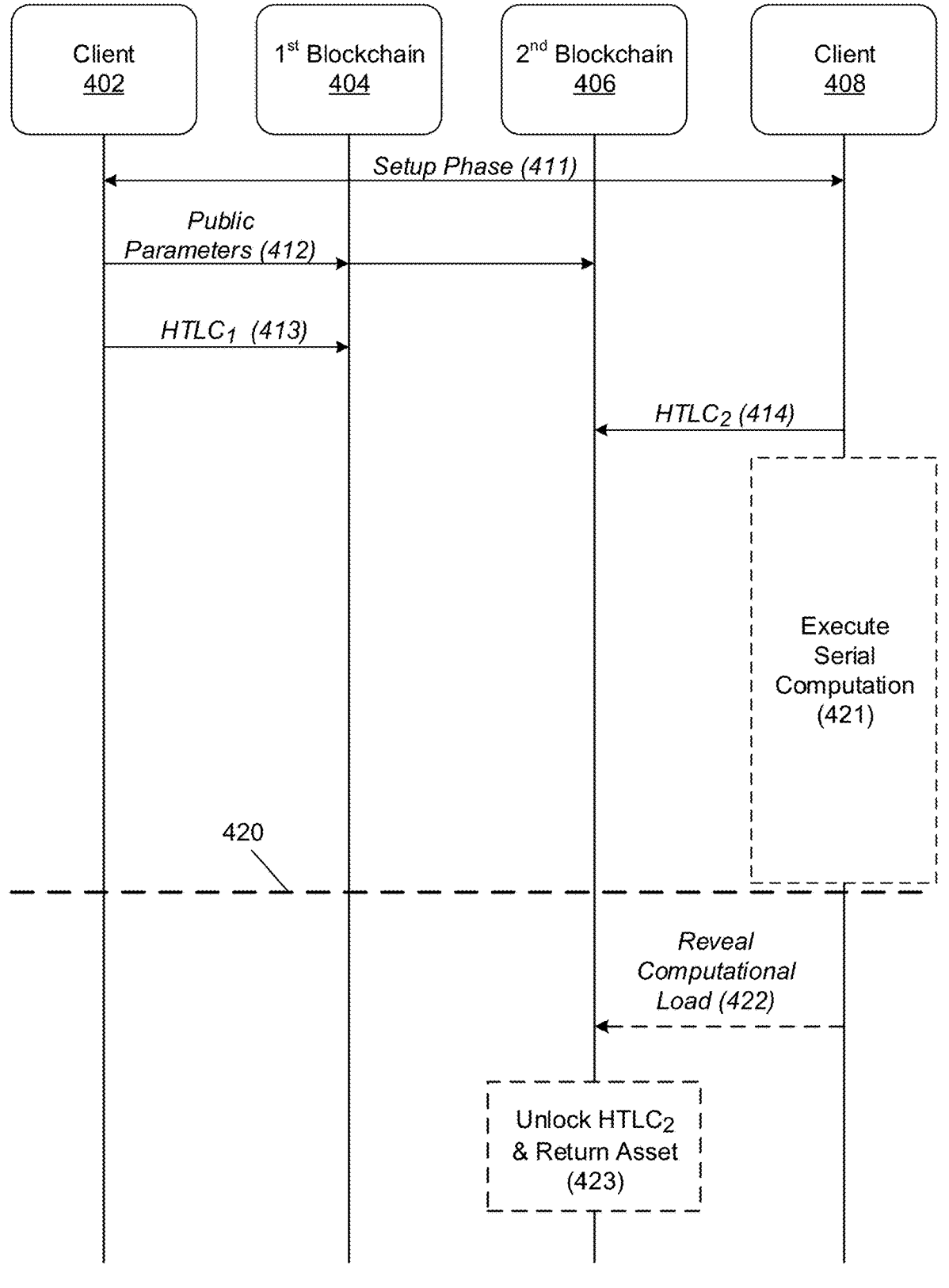
FIG. 4B is a diagram illustrating a communication sequence for aborting the cross-network transaction in lieu of a refund, according to example embodiments.

FIG. 4B illustrates a communication sequence 430 for aborting the cross-network transaction in lieu of a refund, according to example embodiments. Referring to FIG. 4B, the client 402 fails to unlock the HTLC stored by the client 408 on the blockchain 406 within the predetermined amount of time (serial computation steps) identified by the refund clause in the HTLC stored on the blockchain 406 and in FIG. 4B by a line 420. In this example, the client 408 may execute a serial computation a number of steps in 421 to reach the predetermined number of serial computations steps in the refund clause. In this example, the client 408 determines that the client 402 has not unlocked the HTLC stored by the client 408 on the blockchain 406. In other words, the client 402 has failed to satisfy the conditions of the HTLC stored on the blockchain 406. Thus, the client 408 is entitled to a refund.

Accordingly, in 422, the client 408 may reveal the proof of the elapsed time (PoET) created during the serial computation process in 421 by storing it on the blockchain 406. The PoET value that is stored on the blockchain 406 may be the output of the last serial computation performed. In order to arrive at the output of the last serial computation performed, the client 408 executes the serial algorithm the predetermined number of steps, starting with an initial seed value as an input, and then using the output of a previous step of the serial computation as an input to a next step of execution of the serial algorithm. In 423, the blockchain 406 (e.g., a smart contract running on a blockchain peer, etc.) verifies that the PoET is correct based on the HTLC stored on the blockchain 406, and unlocks the HTLC and returns the asset back to the client 408 via the blockchain 406.

Figure 4C:
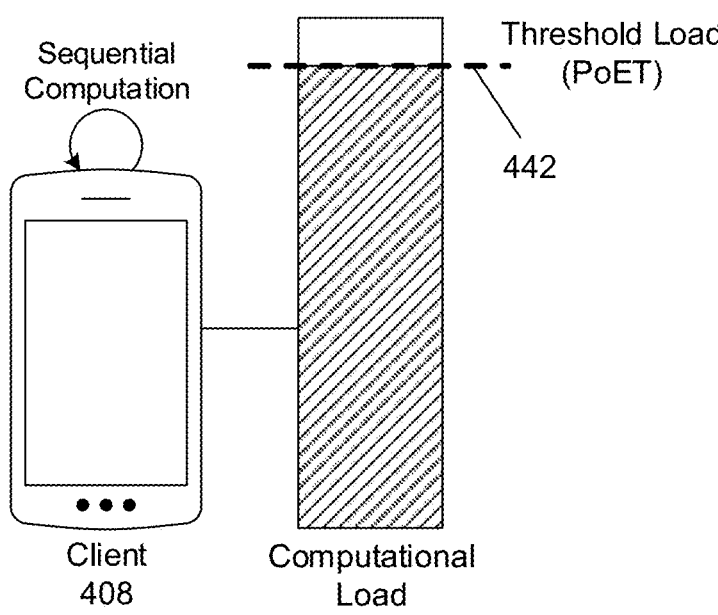
FIG. 4C is a diagram illustrating a computational load threshold of a sender for reclaiming the asset according to example embodiments.
Figure 4D:
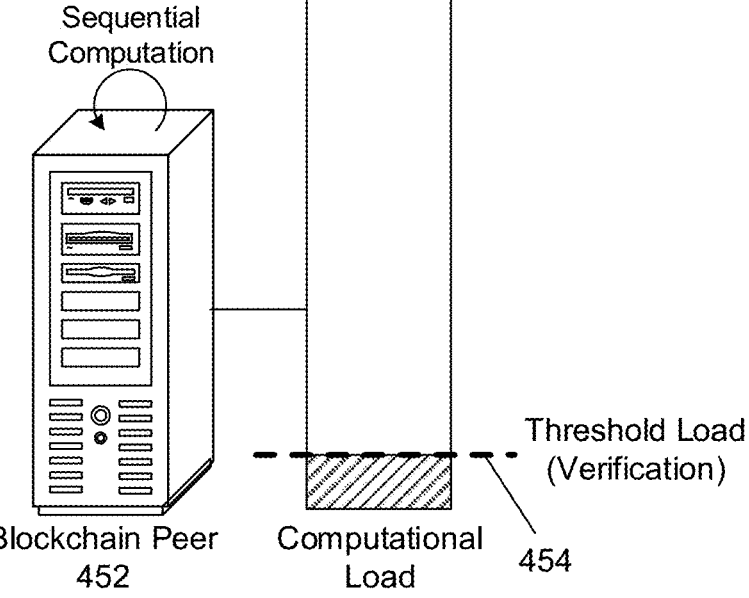
FIG. 4D is a diagram illustrating a computational load threshold of a verifier for verifying the computational load of the sender according to example embodiments.

FIG. 4C illustrates a computational load threshold 442 of a sender for reclaiming unlocking the HTLC and reclaiming the asset according to example embodiments, and FIG. 4D illustrates a computational load threshold 452 of a verifier for verifying the computational load of the sender according to example embodiments. In this example, the computational load threshold 442 may be reached by executing a serial algorithm on an initial seed a several trillion steps while the computational load 452 may be reached after executing the serial algorithm only a thousand steps starting on the initial seed. Thus, the sender can generate both values when creating the PoET. Here, the serial algorithm may be used by the sender to prove the proof of elapsed time (PoET). The PoET value in this case may be the output of the $100^{th}$ executions of the serial algorithm. Meanwhile, the sender may also generate a verification value which is the output of the $10^{th}$ execution of the serial algorithm from the same process. Both values may be stored on the blockchain when the client 408 performs the Eval phase.

Figure 5:
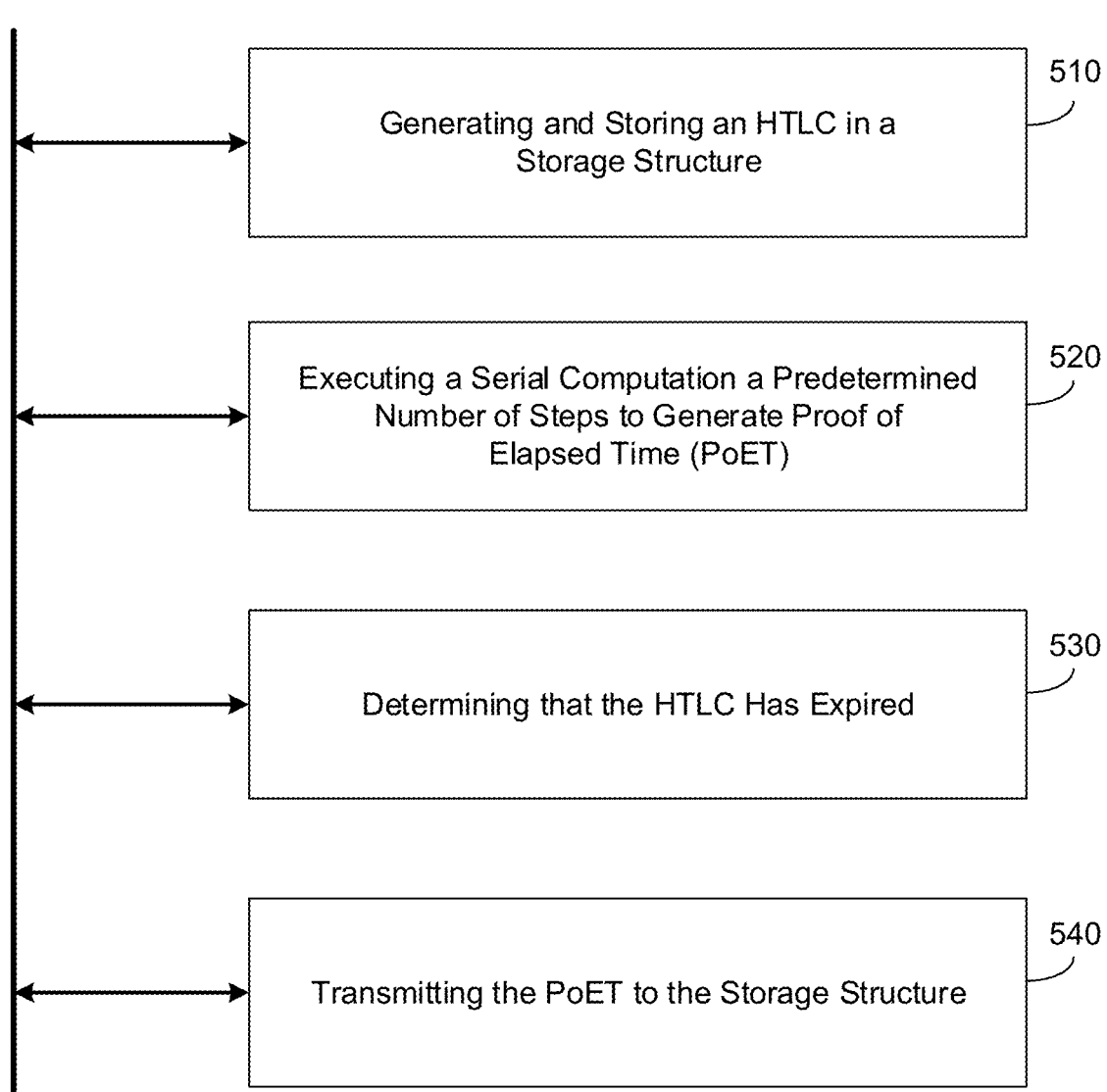
FIG. 5 is a diagram illustrating a method of aborting a cross-chain transaction using computational load as proof-of-elapsed time according to example embodiments.

FIG. 5 illustrates a method 500 of aborting a cross-chain transaction using computational load as proof-of-elapsed time according to example embodiments. As a non-limiting example, the method 500 may be performed by a client, user device, blockchain peer, a trusted service, or the like, which is part of the cross-chain transaction between two or more parties. Referring to FIG. 5, in 510, the method may include generating a hashed timelock contract (HTLC) of an asset and storing the HTLC in a storage structure, where the HTLC requires proof of a condition by a receiver of the asset within a predetermined amount of time for the receiver to unlock the asset.

In 520, the method may include executing, via a processing device, a sequential computation a predetermined number of steps and generating proof of a computational load based on an output of the sequential computation. In 530, the method may include determining that the condition for the client to unlock the HTLC has expired. In 540, the method may include transmitting a request for a refund of the asset which comprises the proof of the computational load as proof of elapsed time to the storage structure.

In some embodiments, the executing may include iteratively executing, via the processing device, a serial algorithm that cannot be parallelized until the serial algorithm has been executed the predetermined number of steps. In some embodiments, the method may further include receiving a random seed value from the receiver or from the blockchain, and the executing comprises iteratively executing the serial algorithm starting with the random seed value provided by the receiver. In some embodiments, the executing may include identifying a chunk of data on which to perform the serial computation based off of public parameters that are posted via the storage structure.

In some embodiments, the storage structure may include a blockchain, and the transmitting may include transmitting a blockchain transaction proposal with the request for the refund and the proof of the computational load to a blockchain peer computer of the blockchain. In some embodiments, the method may further include re-executing the sequential computation a subset of steps with respect to the predetermined number of steps to generate a verification proof. In some embodiments, the method may further include verifying the computational load based on a comparison of the proof of the computational load to the verification proof.

Figure 6A:
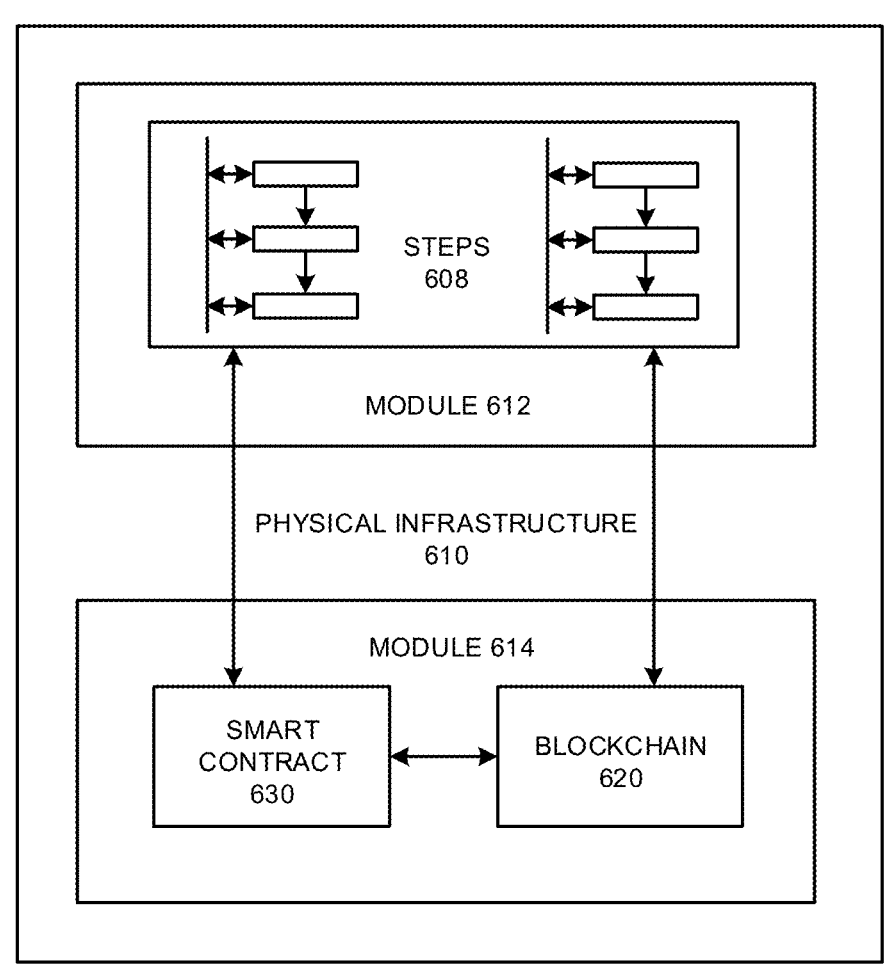
FIG. 6A is a diagram illustrating an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
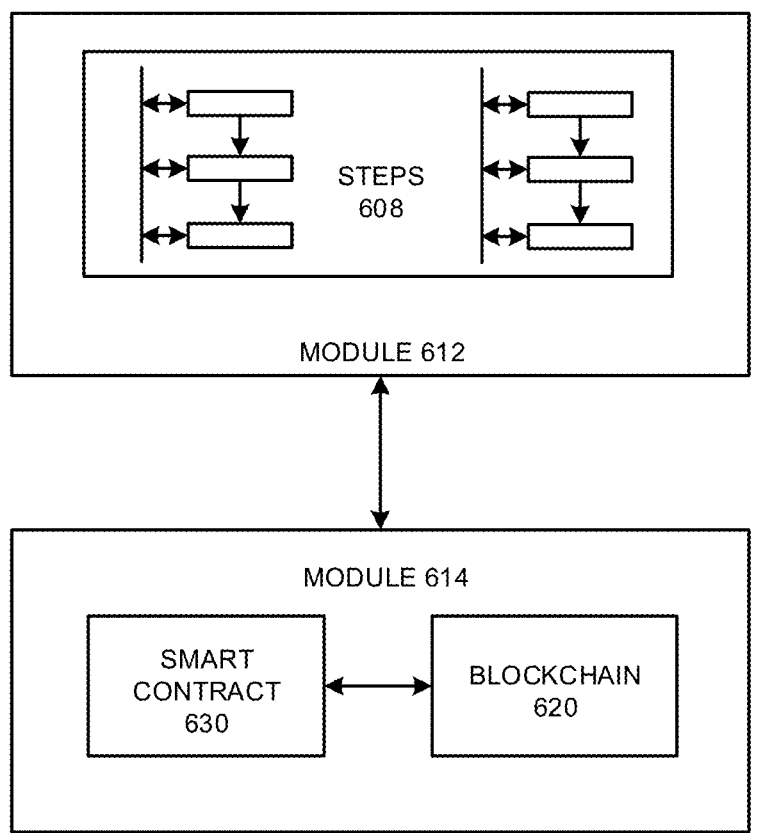
FIG. 6B is a diagram illustrating another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
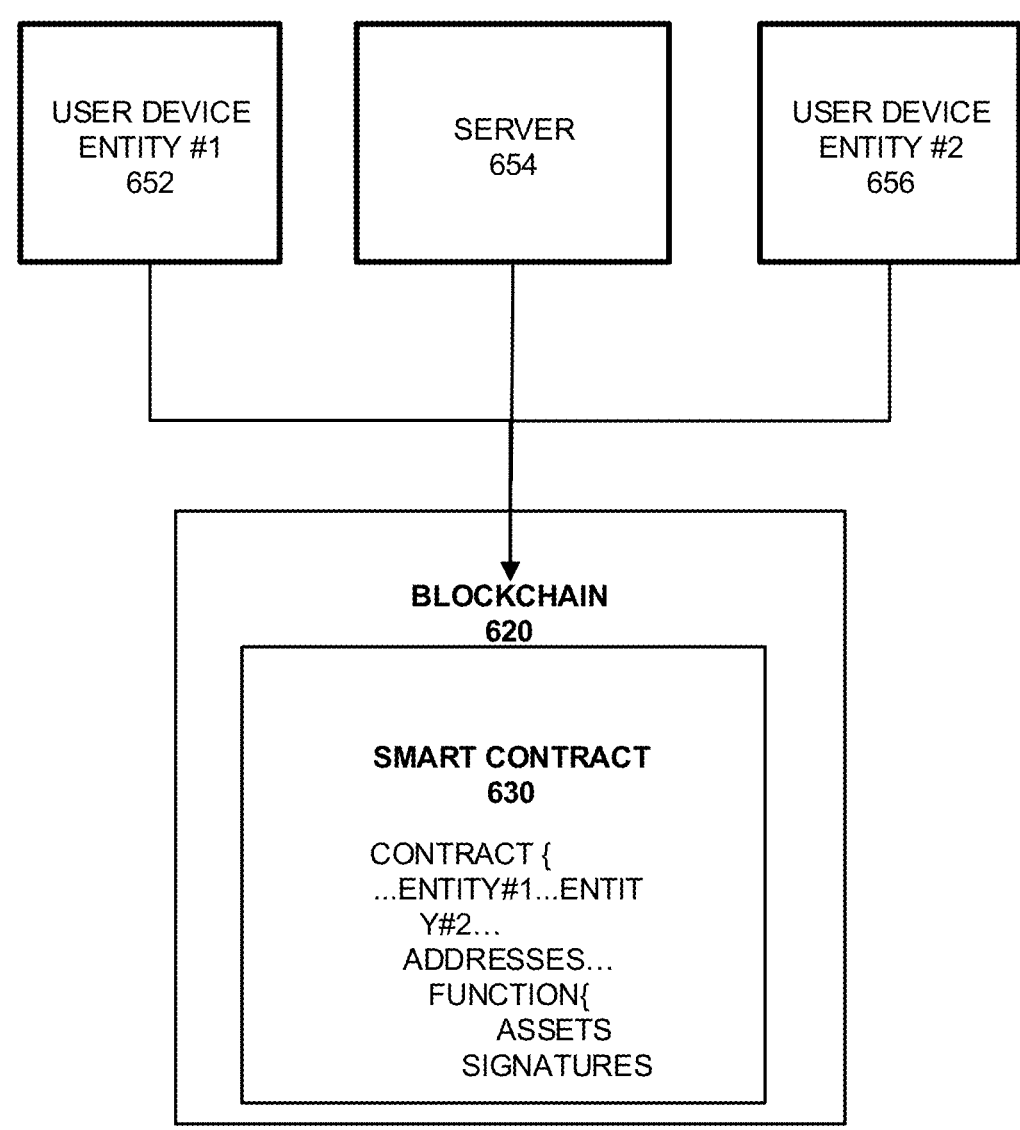
FIG. 6C is a diagram illustrating a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
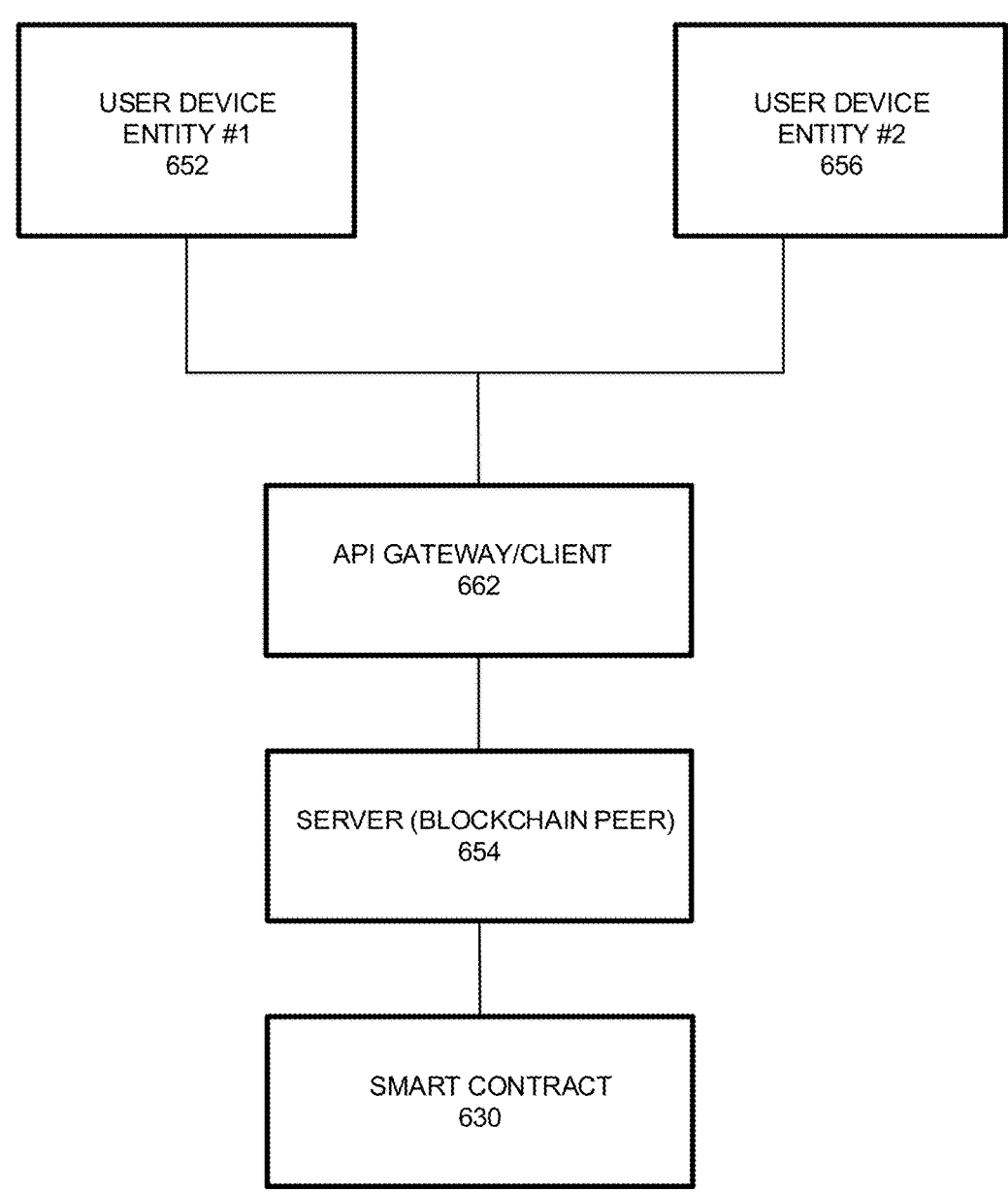
FIG. 6D is a diagram illustrating yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
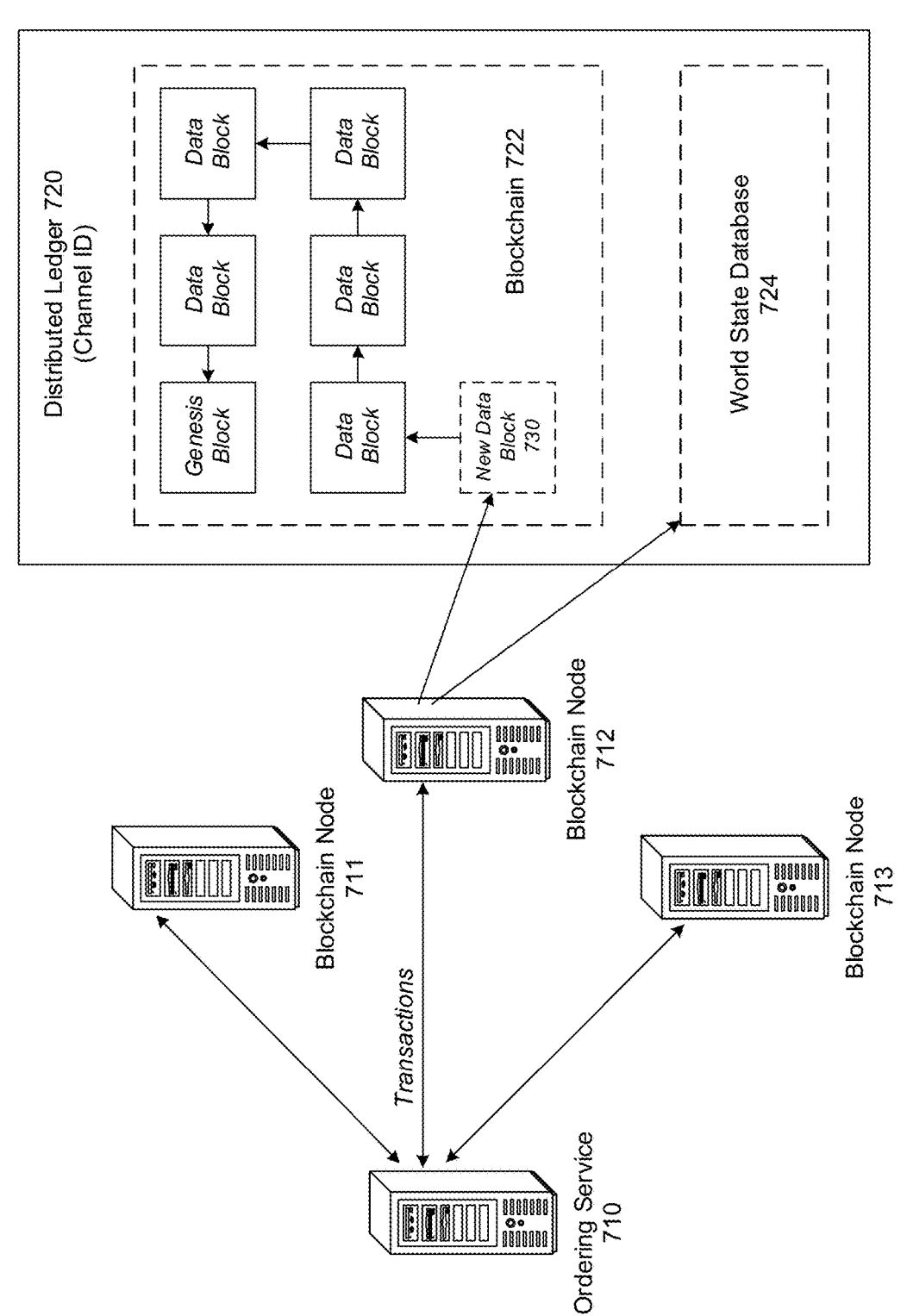
FIG. 7A is a diagram illustrating a process of a new block being added to a distributed ledger, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750 (block data section), and block metadata 760. It should be appreciated that the various depicted blocks and their contents, such as new data block 730 and its contents, shown in FIG. 7B are merely examples and are not meant to limit the scope of the example embodiments. In a conventional block, the data section may store transactional information of N transaction(s) (e.g., 1, 10, 100, 500, 1000, 2000, 3000, etc.) within the block data 750.

The new data block 730 may also include a link to a previous block (e.g., on the blockchain 722 in FIG. 7A) within the block header 740. In particular, the block header 740 may include a hash of a previous block's header. The block header 740 may also include a unique block number, a hash of the block data 750 of the new data block 730, and the like. The block number of the new data block 730 may be unique and assigned in various orders, such as an incremental/sequential order starting from zero.

According to various embodiments, the block data 750 may also store attributes 752 associated with the HTLC such as the public parameters, the number of serial computations to perform, the initial seed value, the PoET (e.g., the output of the last serial computation, etc.) The HTLCs attributes 752 include one or more of the steps, features, processes and/or actions described or depicted herein. Accordingly, the attributes 752 of the HTLC can be stored in an immutable log of blocks on the distributed ledger 720. Some of the benefits of storing the attributes 752 on the blockchain are reflected in the various embodiments disclosed and depicted herein. Although in FIG. 7B, the attributes 752 are depicted in the block data 750, it may be located in the block header 740 or the block metadata 760.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions that are included in the block data 750 and a validation code identifying whether a transaction was valid/invalid.

Figure 7C:
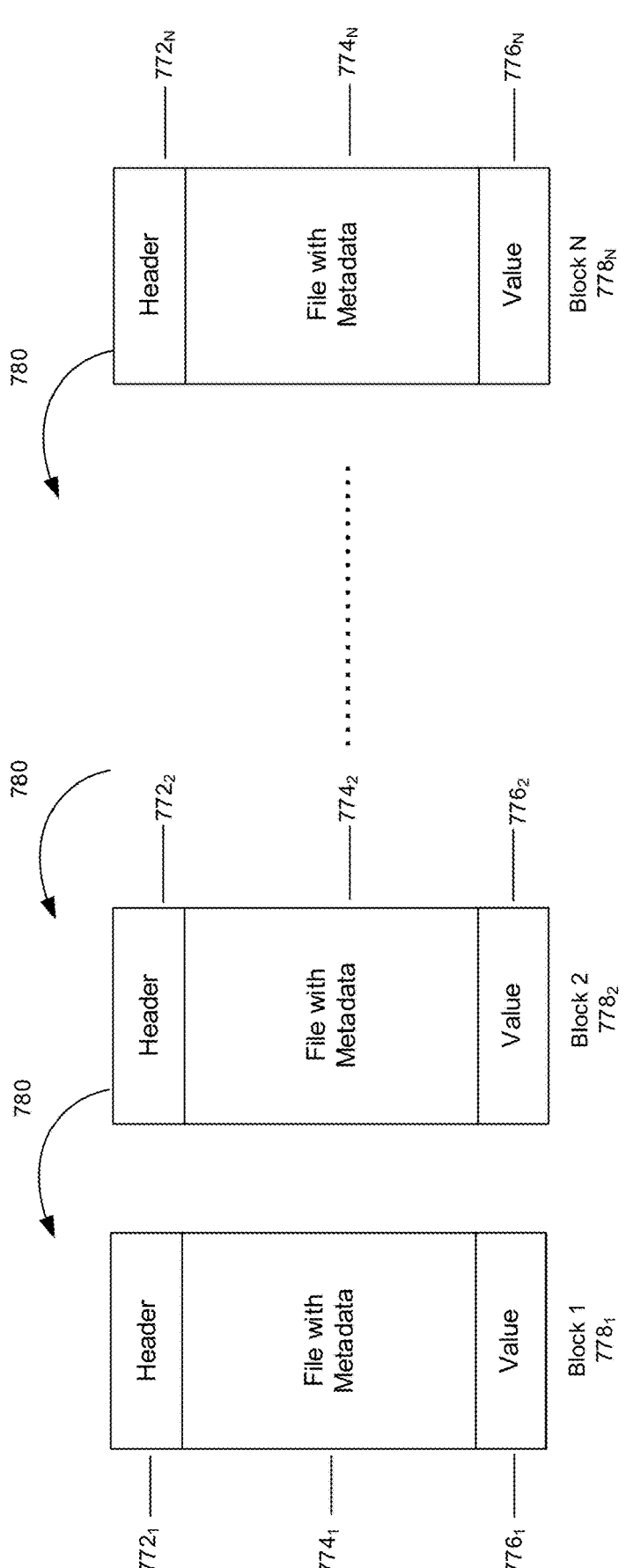
FIG. 7C is a diagram illustrating a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken into consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | . . . | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks 778₁, 778₂, . . . 778ₙ cryptographically linked in an ordered sequence, where $N \geq 1$. The encryption used to link the blocks 778₁, 778₂, . . . 778ₙ may be any of a number of keyed or un-keyed Hash functions. In one embodiment, the blocks 778₁, 778₂, . . . 778ₙ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks 778₁, 778₂, . . . , 778ₙ may be cryptographically linked by a function that is different from a hash function. For purposes of illustration, the following description is made with reference to a hash function, e.g., SHA-2.

Each of the blocks 778₁, 778₂, . . . , 778ₙ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows $780$, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
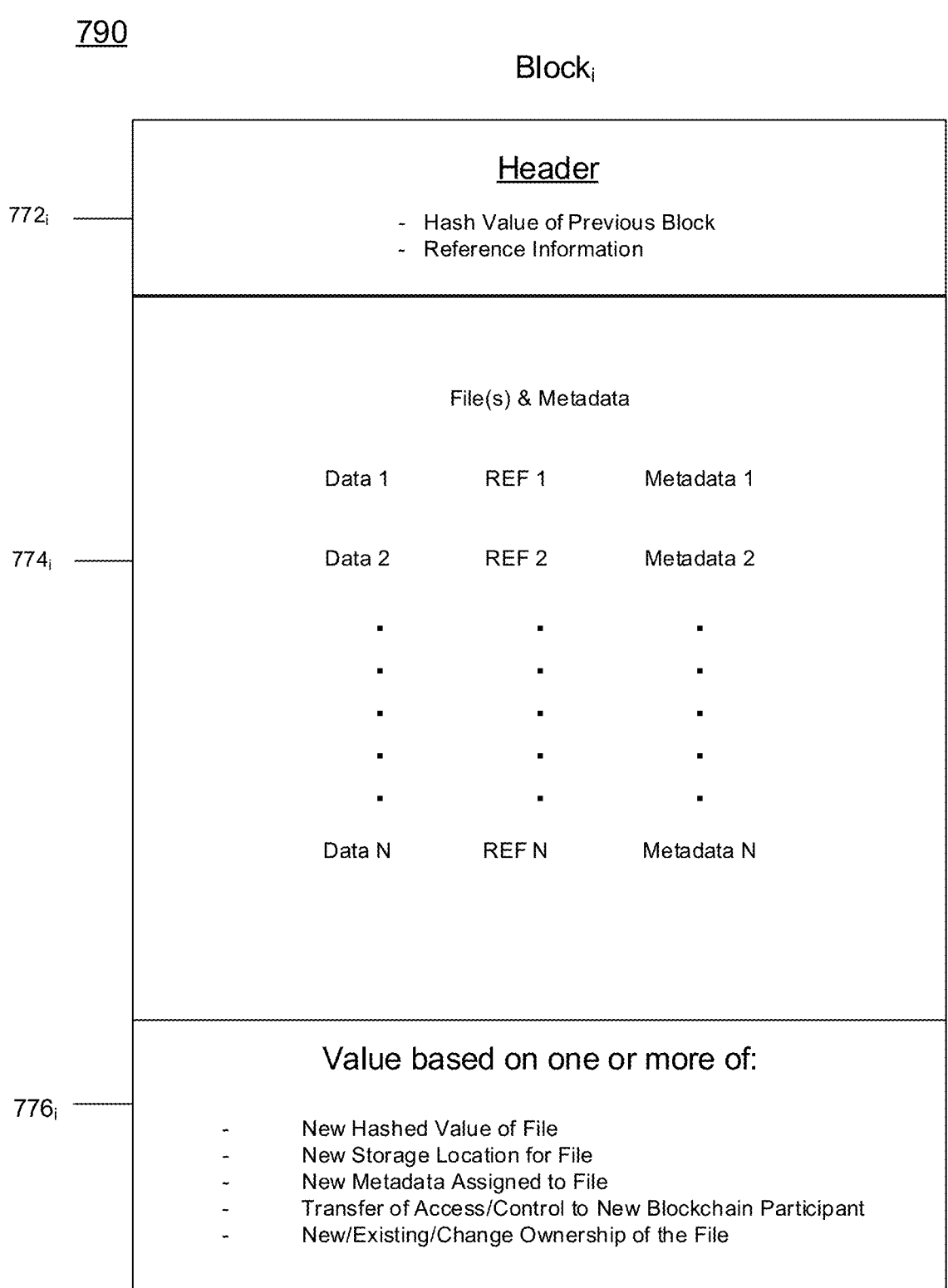
FIG. 7D is a diagram illustrating a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain $790$ in accordance with one embodiment. The block, Block$_i$, includes a header $772_i$, a file $774_i$, and a value $776_i$.

The header $772_i$ includes a hash value of a previous block Block$_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
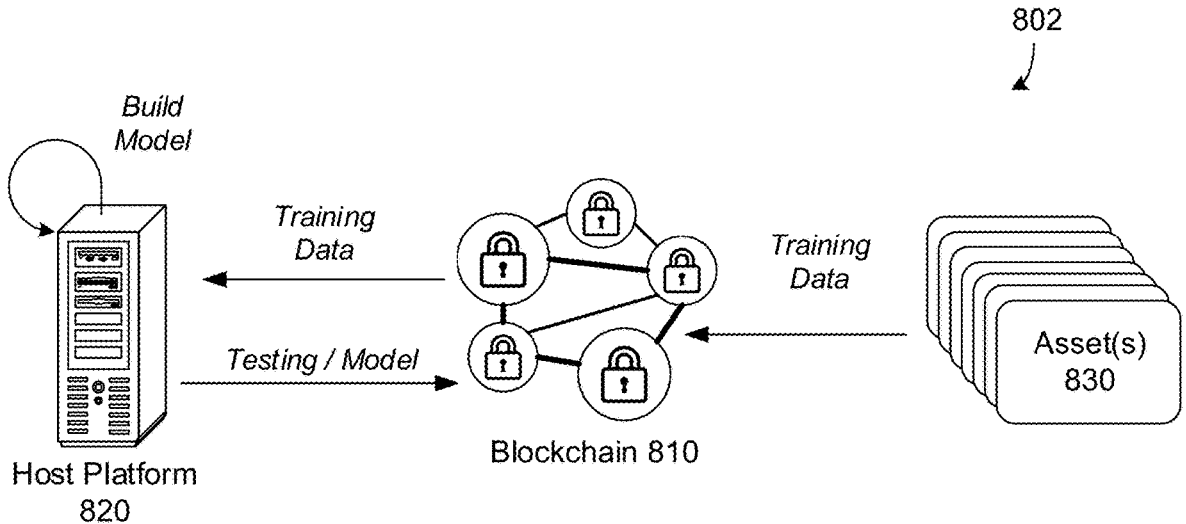
FIG. 8A is a diagram illustrating an example blockchain which stores machine learning (artificial intelligence) data, according to example embodiments.
Figure 8A:
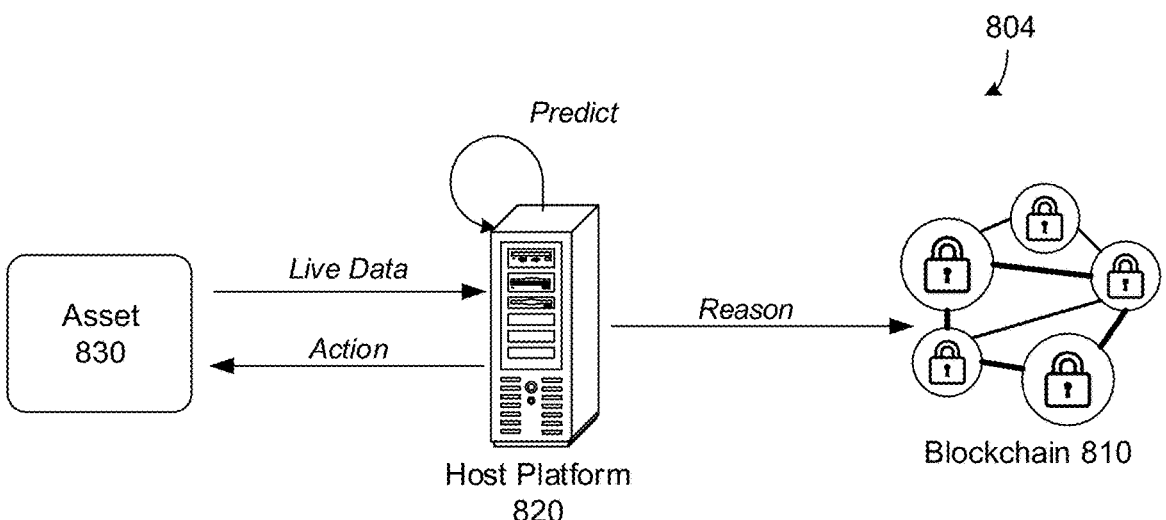
Figure 8B:
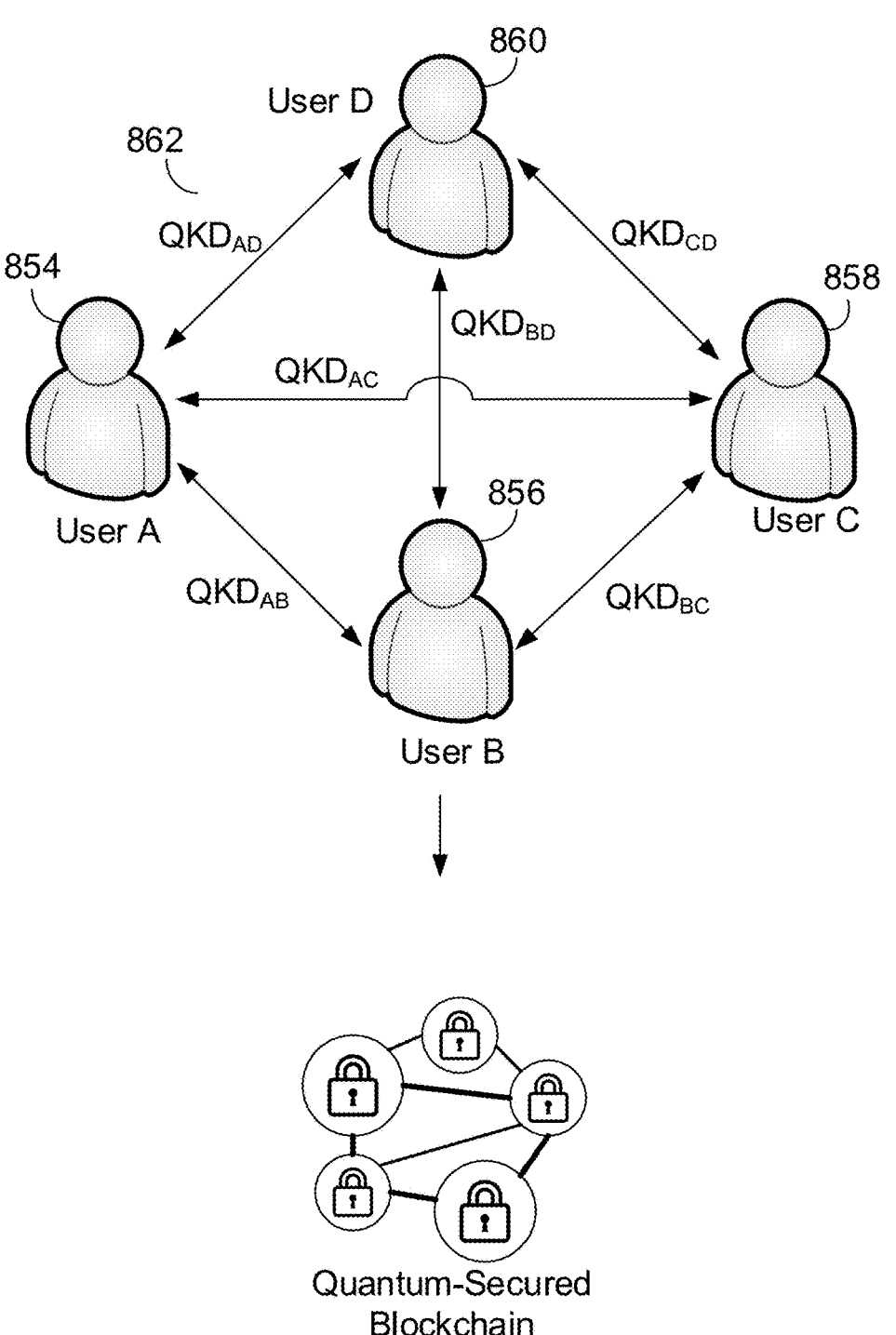
FIG. 8B is a diagram illustrating an example quantum-secure blockchain, according to example embodiments.

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
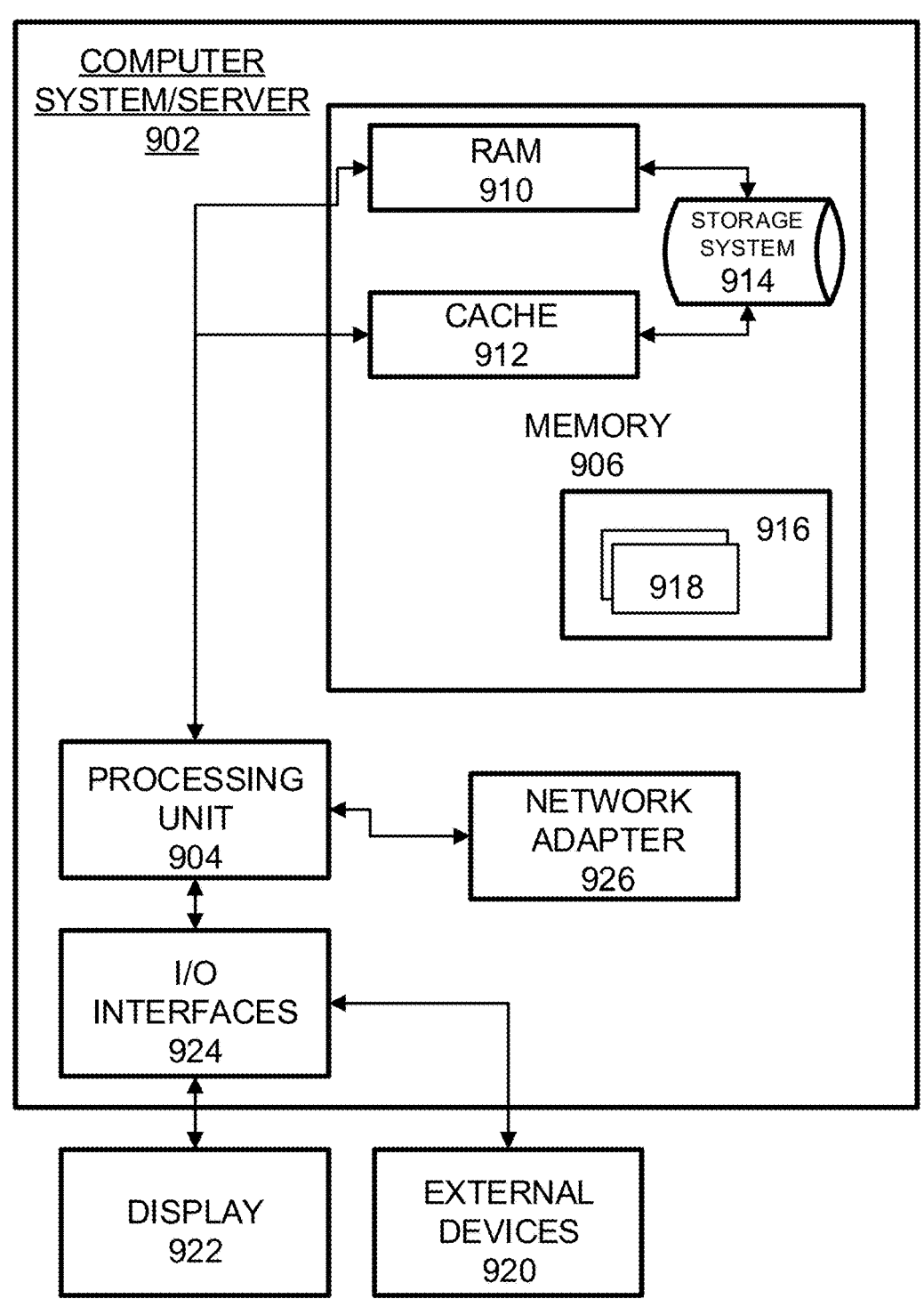
FIG. 9 is a diagram illustrating an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:
a memory that comprises a storage structure; and
a processor configured to:
    generate a hashed timelock contract (HTLC) of an asset;
    store the HTLC in the storage structure, wherein the HTLC comprises an instruction that:
        requires a proof of a condition by a receiver of the asset within a predetermined amount of time for a sender to reclaim the asset, and
        indicates a predetermined number of steps of a sequential computation, corresponding to the predetermined amount of time;
    execute the sequential computation comprising the predetermined number of steps, wherein the execution of the sequential computation comprises execution of a serial algorithm that cannot be parallelized until the serial algorithm has been executed the predetermined number of steps;
    generate a proof of a computational load as a proof of elapsed time, based on an output of the sequential computation, wherein the computational load indicates the predetermined amount of time required for the sender to reclaim the asset;
    determine, based on the proof of the computational load, that the condition to unlock the HTLC has expired; and
    transmit, based on the determination that the condition to unlock the HTLC has expired, a request for a refund of the asset which comprises the proof of the computational load as the proof of the elapsed time to the storage structure.

2. The apparatus of claim 1, wherein the processor is further configured to:
    receive a random seed value from the receiver; and
    iteratively execute the serial algorithm that starts with the random seed value provided by the receiver.

3. The apparatus of claim 1, wherein the processor is further configured to:
    receive a random seed value from a blockchain ledger; and
    iteratively execute the serial algorithm that starts with the random seed value provided by the blockchain ledger.

4. The apparatus of claim 1, wherein the execution of the sequential computation comprises identification of a chunk of data on which to perform the sequential computation based on public parameters that are posted via the storage structure.

5. The apparatus of claim 1, wherein the storage structure comprises a blockchain, and the transmission of the request for the refund further comprises transmission of a blockchain transaction proposal with the request for the refund and the proof of the computational load to a blockchain peer computer of the blockchain.

6. The apparatus of claim 1, wherein the processor is further configured to re-execute the sequential computation that comprises execution of a subset of steps with respect to the predetermined number of steps to generate a verification proof.

7. The apparatus of claim 6, wherein the processor is further configured to verify the computational load based on a comparison of the proof of the computational load to the verification proof.

8. A computer-implemented method, comprising:
generating a hashed timelock contract (HTLC) of an asset;
storing the HTLC in a storage structure, wherein the HTLC comprises an instruction that:
    requires a proof of a condition by a receiver of the asset within a predetermined amount of time for the receiver to unlock the asset, and
    indicates a predetermined number of steps of a sequential computation, corresponding to the predetermined amount of time;
executing, via a processing device, the sequential computation comprising the predetermined number of steps, wherein the executing of the sequential computation comprises executing, via the processing device, a serial algorithm that cannot be parallelized until the serial algorithm has been executed the predetermined number of steps;
generating a proof of a computational load as a proof of elapsed time, based on an output of the sequential computation, wherein the computational load indicates the predetermined amount of time required for a sender to reclaim the asset;
determining, based on the proof of the computational load, that the condition for the receiver to unlock the HTLC has expired; and
transmitting, based on the determining that the condition to unlock the HTLC has expired, a request for a refund of the asset.

9. The computer-implemented method of claim 8, further comprising receiving a random seed value from one or more of the receiver and a blockchain ledger, wherein the executing comprises iteratively executing the serial algorithm starting with the random seed value.

10. The computer-implemented method of claim 8, wherein the executing of the sequential computation comprises identifying a chunk of data on which to perform the sequential computation based on public parameters that are posted via the storage structure.

11. The computer-implemented method of claim 8, wherein the transmitting of the request for the refund comprises transmitting a blockchain transaction proposal with the request for the refund and the proof of the computational load to a blockchain peer computer of a blockchain, and wherein the storage structure comprises the blockchain.

12. The computer-implemented method of claim 8, further comprising re-executing the sequential computation that comprises executing a subset of steps with respect to the predetermined number of steps to generate a verification proof.

13. The computer-implemented method of claim 12, further comprising verifying the computational load based on a comparison of the proof of the computational load to the verification proof.

14. A computer storage device comprising instructions, that when executed by a processor, cause the processor to perform:
   generating a hashed timelock contract (HTLC) of an asset;
   storing the HTLC in a storage structure, wherein
      the HTLC comprises an instruction that:
         requires a proof of a condition by a receiver within a predetermined amount of time for the receiver to unlock the asset, and
         indicates a predetermined number of steps of a sequential computation, corresponding to the predetermined amount of time;

executing, via a processing device, the sequential computation comprising the predetermined number of steps, wherein the executing of the sequential computation comprises executing, via the processing device, a serial algorithm that cannot be parallelized until the serial algorithm has been executed the predetermined number of steps;
   generating a proof of a computational load as a proof of elapsed time, based on an output of the sequential computation, wherein the computational load indicates the predetermined amount of time required for a sender to reclaim the asset;
   determining, based on the proof of the computational load, that the condition for the receiver to unlock the HTLC has expired; and
   transmitting, based on the determining that the condition to unlock the HTLC has expired, a request for a refund of the asset.

15. The computer storage device of claim 14, wherein the instructions further cause the processor to perform receiving a random seed value from one or more of the receiver and a blockchain ledger, and the executing of the serial algorithm comprises iteratively executing the serial algorithm starting with the random seed value.

16. The computer storage device of claim 14, wherein the executing of the sequential computation comprises identifying a chunk of data on which to perform the sequential computation based on public parameters that are posted via the storage structure.

17. The computer storage device of claim 14, wherein the transmitting of the request for the refund comprises transmitting a blockchain transaction proposal with the request for the refund and the proof of the computational load to a blockchain peer computer of a blockchain, and wherein the storage structure comprises the blockchain.

* * * * *